(12) United States Patent
Lipke et al.

(10) Patent No.: US 11,811,163 B2
(45) Date of Patent: Nov. 7, 2023

(54) MUTOA AND QUAD FLOATING CONNECTOR

(71) Applicant: Leviton Manufacturing Co., Inc., Melville, NY (US)

(72) Inventors: Dean Lipke, Mill Creek, WA (US); Daniel Underbrink, Mill Creek, WA (US); Hua Wang, Mill Creek, WA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 144 days.

(21) Appl. No.: 17/187,159

(22) Filed: Feb. 26, 2021

(65) Prior Publication Data

US 2022/0278480 A1    Sep. 1, 2022

(51) Int. Cl.
*H01R 25/00* (2006.01)
*H01R 13/518* (2006.01)
*G02B 6/36* (2006.01)
*H01R 13/514* (2006.01)

(52) U.S. Cl.
CPC ......... *H01R 13/518* (2013.01); *G02B 6/3616* (2013.01); *H01R 13/514* (2013.01); *H01R 25/003* (2013.01)

(58) Field of Classification Search
CPC .. H01R 13/514; H01R 13/516; H01R 13/518; H01R 25/003; G02B 6/3616; G02B 6/362
USPC ....................................................... 439/640
See application file for complete search history.

(56) References Cited

U.S. PATENT DOCUMENTS

| | | |
|---|---|---|
| 4,283,150 A | 8/1981 | Hanazono et al. |
| 4,528,728 A | 7/1985 | Schmidt et al. |
| 4,659,119 A | 4/1987 | Reimert |
| 4,692,809 A | 9/1987 | Beining et al. |
| 4,767,338 A | 8/1988 | Dennis et al. |
| 5,004,866 A | 4/1991 | Cooke et al. |
| 5,312,263 A | 5/1994 | Zapalski et al. |
| 5,713,752 A | 2/1998 | Leong et al. |
| 5,781,366 A | 7/1998 | Matsuoka |
| 6,485,322 B1 | 11/2002 | Branch et al. |
| 6,796,715 B2 | 9/2004 | Chiu et al. |
| 6,857,900 B2 | 2/2005 | Kleeberger et al. |

(Continued)

FOREIGN PATENT DOCUMENTS

| | | |
|---|---|---|
| CA | 2880810 A1 | 2/2014 |
| CA | 2830521 A1 | 8/2019 |

(Continued)

OTHER PUBLICATIONS

Office Action received for GB Patent Application Serial No. 2202322.0 dated Aug. 22, 2022, 5 pages.

*Primary Examiner* — Khiem M Nguyen
(74) *Attorney, Agent, or Firm* — Amin, Turocy & Watson, LLP

(57) ABSTRACT

A floating quad connector assembly is designed to hold two pairs of simplex connecters in a quad formation and to permit the two pairs of connectors to float within the assembly, thereby rendering the quad connector assembly compatible with different quad adapters having different spacings between the two middle simplex ports. Also, a segmental switch module is configured to aggregate multiple category-rated connectors in an array formation while permitting the spacings between the connectors to float, thereby rendering the switch module compatible with port arrays of different port-to-port spacings.

20 Claims, 26 Drawing Sheets

(56) References Cited

U.S. PATENT DOCUMENTS

| | | |
|---|---|---|
| 6,866,548 B2 | 3/2005 | Hashim |
| 7,025,635 B2 | 4/2006 | Chang |
| 7,029,290 B2 | 4/2006 | Wu |
| 7,131,862 B2 | 11/2006 | Vermeersch |
| 7,298,946 B2 | 11/2007 | Mueller |
| 7,347,633 B2 | 3/2008 | Minota |
| 7,448,909 B2 | 11/2008 | Regnier et al. |
| 7,473,131 B2 | 1/2009 | Dunwoody et al. |
| 7,517,254 B2 | 4/2009 | Zhang et al. |
| 7,618,264 B2 | 11/2009 | Wu |
| 7,651,341 B2 | 1/2010 | Wu |
| 7,651,342 B1 | 1/2010 | Wu |
| 7,654,831 B1 | 2/2010 | Wu |
| 7,658,622 B2 | 2/2010 | Bartholomew |
| 7,658,651 B2 | 2/2010 | Pepe et al. |
| 7,658,652 B2 | 2/2010 | Sawatari et al. |
| 7,674,136 B2 | 3/2010 | Steinke et al. |
| 7,722,390 B2 | 5/2010 | Debenedictis et al. |
| 7,736,176 B2 | 6/2010 | Zhang et al. |
| 7,794,278 B2 | 9/2010 | Cohen et al. |
| 7,841,779 B1 | 11/2010 | Bianchini et al. |
| 7,845,984 B2 | 12/2010 | Schaffer et al. |
| 7,854,632 B2 | 12/2010 | Reeves et al. |
| 7,874,879 B2 | 1/2011 | Caveney et al. |
| 7,901,238 B1 | 3/2011 | Muir et al. |
| 8,011,950 B2 | 9/2011 | McGrath et al. |
| 8,062,073 B1 | 11/2011 | Szczesny et al. |
| 8,075,348 B2 | 12/2011 | Mei et al. |
| 8,096,839 B2 | 1/2012 | Abughazaleh et al. |
| 8,147,272 B2 | 4/2012 | Rhein |
| 8,235,731 B1 | 8/2012 | Poulsen et al. |
| 8,337,243 B2 | 12/2012 | Elkhatib et al. |
| 8,740,478 B2 | 5/2014 | Weberpals |
| 8,781,284 B2 | 7/2014 | Bragg |
| 8,958,680 B2 | 2/2015 | Bragg |
| 9,077,126 B2 | 7/2015 | Bragg |
| 9,236,691 B2 | 1/2016 | Bragg |
| 10,649,152 B1 | 5/2020 | Yang |
| 2001/0005591 A1 | 6/2001 | Qasba et al. |
| 2001/0055916 A1 | 12/2001 | Arnett |
| 2002/0013112 A1 | 9/2002 | Anderl et al. |
| 2002/0131122 A1 | 9/2002 | Underl et al. |
| 2003/0011934 A1 | 6/2003 | Lin et al. |
| 2003/0119343 A1 | 6/2003 | Lin et al. |
| 2004/0077222 A1 | 4/2004 | AbuGhazaleh et al. |
| 2005/0026509 A1 | 2/2005 | Chang |
| 2005/0202722 A1 | 9/2005 | Regnier et al. |
| 2005/0208822 A1 | 9/2005 | Ishigami et al. |
| 2006/0003017 A1 | 2/2006 | Wu |
| 2006/0030172 A1 | 2/2006 | Wu |
| 2006/0091545 A1 | 5/2006 | Casher et al. |
| 2006/0094267 A1 | 5/2006 | Li |
| 2006/0103140 A1 | 5/2006 | Bella et al. |
| 2006/0121789 A1 | 6/2006 | Hashim |
| 2006/0134946 A1 | 6/2006 | William Vermeersch |
| 2006/0266549 A1 | 11/2006 | Lin et al. |
| 2007/0105410 A1 | 5/2007 | Wu |
| 2007/0178772 A1 | 8/2007 | Hashim et al. |
| 2007/0184724 A1 | 8/2007 | Adriaenssens et al. |
| 2007/0025957 A1 | 11/2007 | Machado et al. |
| 2007/0259573 A1 | 11/2007 | Machado et al. |
| 2007/0293094 A1 | 12/2007 | Aekins |
| 2008/0214058 A1 | 9/2008 | Machado et al. |
| 2008/0305680 A1 | 12/2008 | Little et al. |
| 2008/0305692 A1 | 12/2008 | Little et al. |
| 2009/0104821 A1 | 4/2009 | Marti et al. |
| 2009/0138637 A1 | 5/2009 | Hargreaves et al. |
| 2009/0191758 A1 | 7/2009 | Aekins |
| 2009/0197438 A1 | 8/2009 | Liu et al. |
| 2010/0093227 A1 | 4/2010 | Krk |
| 2011/0177710 A1 | 7/2011 | Tobey |
| 2011/0281474 A1 | 11/2011 | Weinmann et al. |
| 2012/0064779 A1 | 3/2012 | Wu |
| 2016/0349458 A1 | 12/2016 | Murray et al. |

FOREIGN PATENT DOCUMENTS

| | | |
|---|---|---|
| CN | 207882511 U | 9/2018 |
| CN | 209400744 U | 9/2019 |
| EP | 3 940 439 A1 | 1/2022 |
| JP | H10-227945 A | 8/1998 |
| WO | 2012128995 A2 | 9/2012 |
| WO | 2014021901 A1 | 2/2014 |

MUTOA AND QUAD FLOATING CONNECTOR

TECHNICAL FIELD

The disclosed subject matter relates generally to data cabling, and, in particular, to fiber optic and copper cable connectors

BACKGROUND

Many fiber optic systems employ Lucent Connector (LC) fiber optic connectors for termination and connectivity of fiber optic cables. The small form factor of these LC connectors allows a large number of fiber optic cables to be connected in high density arrays, such as those found in fiber optic patch panels used in data centers. Simplex LC connectors house a single optical fiber terminated on a ferrule that protrudes from the front of the connector housing, thereby providing termination and connectivity for a single data line. Duplexed LC connectors together house two optical fibers that are terminated on respective ferrules that protrude from the front of the duplexed connectors, providing termination and connectivity for a transmit fiber and a receive fiber. The small form factor of the LC connector— whether used as a simplex or as a duplexed pair—affords a number of advantages, particularly in high density environment.

Some fiber optic devices include four-port adapters, also referred to as quad adapters, which each comprise four simplex ports arranged horizontally. The ports of these quad adaptors can interface with four corresponding simplex connectors or with two duplex connectors. Currently, there is no standard defining the distance between the two duplex adapters of a quad adapter. Consequently, while there may be benefits to using a four-port connector to engage with these quad adaptors, this lack of spacing standardization creates challenges in designing such a connector, since the distances between the two middle ports can vary between devices.

The above-described deficiencies of current optical connection systems are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments described herein provide a quad connector assembly that can be used to aggregated multiple simplex fiber optic connectors to yield a composite quad connector that can be plugged into a range of quad adapters having different spacings. To accommodate variable spacings between the two middle ports of a quad adapter, the connector assembly can group the four simplex connectors into two duplex groups and permit each group to slide independently within the connector housing, allowing the distance between the two duplex groups to be varied within a range permitted by the connector while maintaining a consistent standardized spacing between the connectors of each duplex group.

Also, a modular connector organization system is provided that allows customized connector arrays to be easily assembled using modular components. Embodiments of this connector organization system can be used to create an organized connector array compatible with a corresponding array of data ports.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figure 1:
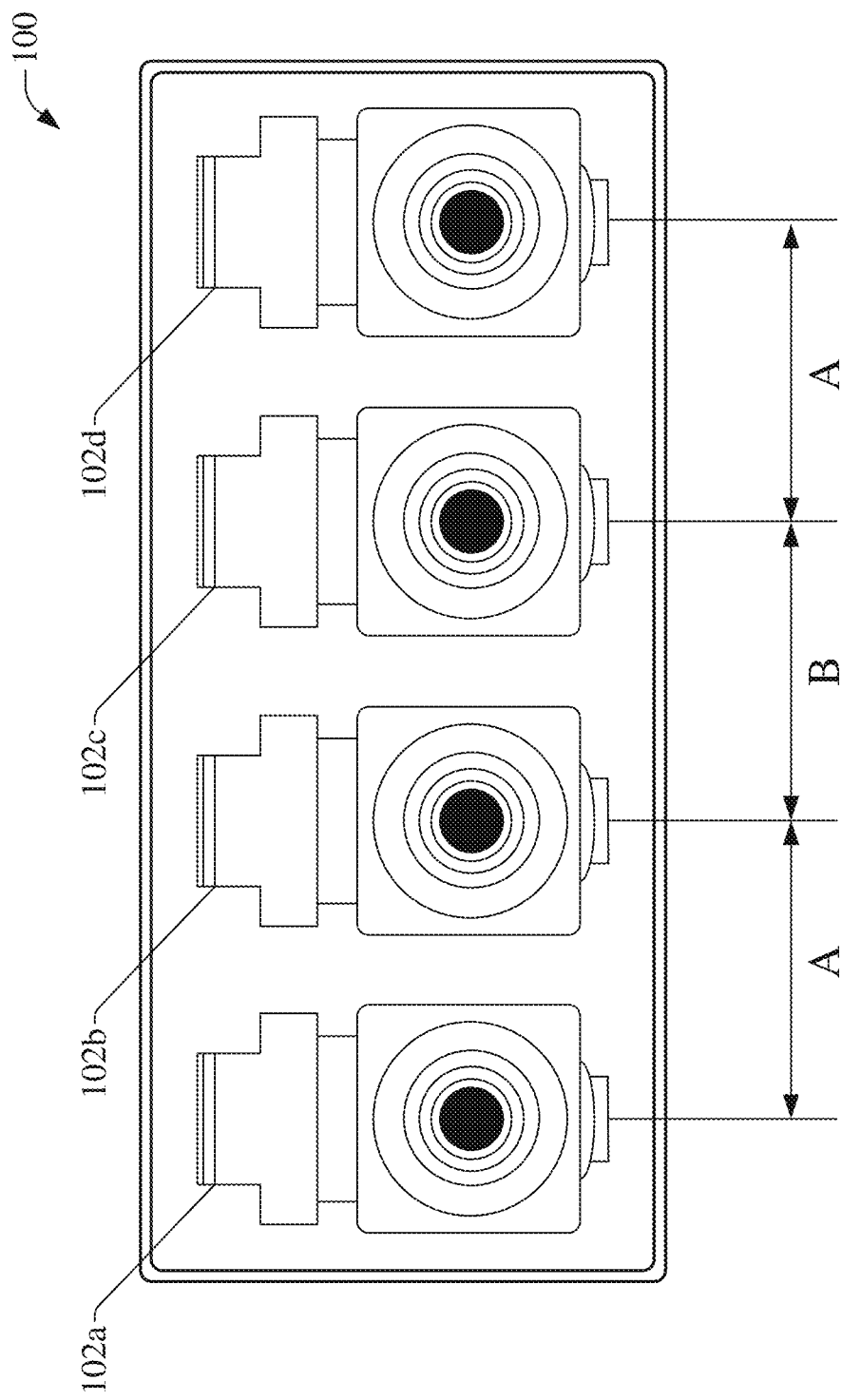
FIG. 1 is a front view of an example four-port, or quad, fiber optic adapter.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is a front view of an example four-port, or quad, fiber optic adapter 100. Quad adapter 100 can be part of a device that communicates data over a fiber optic connection via the adapter 100, such as a patch panel device. The adapter 100 comprises four simplex ports 102a-102d arranged horizontally, with each of the ports 102a-102d configured to receive a corresponding simplex fiber optic connector. Alternatively, two duplex fiber optic connectors can be plugged into the quad adapter 100, such that a first duplex connector plugs into the first pair of simplex ports 102a and 102b, and a second duplex connector plugs into the second pair of simplex ports 102c and 102d. The distance A between the simplex ports 102a and 102b of the first pair and between the simplex ports 102c and 102d of the second pair corresponds to the distance between the ferrules of the duplex connectors. Distance B is the distance between the two middle simplex ports 102b and 102c.

In some devices, the distances between adjacent ports 102 may be equal for each pair of adjacent ports 102, such that distance A is equal to distance B. However, since there is currently no standard that dictates the distance B between the two middle ports 102b and 102c, distance B may vary across different devices.

As an alternative to using four simplex connectors or two duplex connectors, a four-port connector— or quad connector— could be used to interface with a quad adapter 100. A single quad connector can be more easily and quickly engaged with, and disengaged from, the quad adapter 100 relative to using four independent simplex connectors or two separate duplex connectors, and can better maintain organization of the individual fibers by preventing twisting of fibers.

However, since the distance B between the two middle simplex ports 102b and 102c can vary between devices, a quad connector design with fixed spacing between ferrules would not be compatible across multiple quad adapters 100 having different distances B between the middle ports 102b and 102c. Consequently, manufacturers of quad connectors that use fixed spacings would have to custom manufacture different versions of their connector with respective different B distances to accommodate different port spacings favored by different device vendors.

To address these and other issues, one or more embodiments described herein provide a quad connector assembly, referred to herein as a floating quad connector, that is compatible with different quad adapters 100 having different spacings between the two middle simplex ports 102b and 102c. In one or more embodiments, the quad connector assembly is designed to hold four simplex connectors in a quad connector arrangement, such that the distance A between the ferrules of the first and second connectors and between the third and fourth connectors remained fixed in accordance with a standardized duplex connector spacing, and the distance B between the second and third connectors (the middle spacing) is permitted to float so that the resulting quad connector can be adapted to interface with any quad adapter 100 regardless of the middle port spacing represented by distance B.

Figure 2:
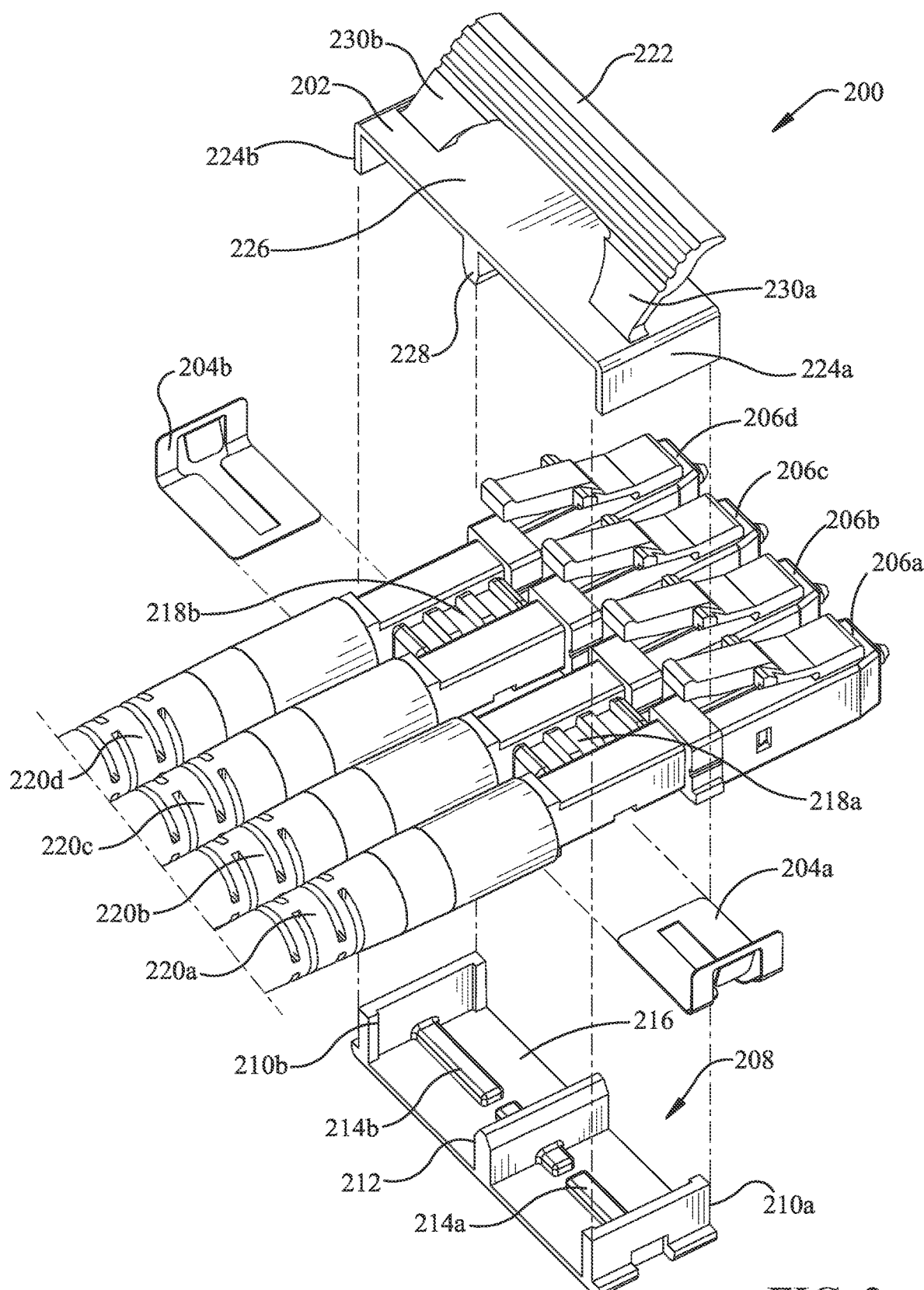
FIG. 2 is an exploded view of an example quad connector assembly.

FIG. 2 is an exploded view of an example quad connector assembly 200 according to one or more embodiments. In the illustrated embodiment, the quad connector assembly 200 is designed to hold four LC simplex connectors 206a-206d in a horizontal arrangement. Although the example embodiments described and illustrated herein depict the quad connector assembly 200 being used to hold LC connectors, other embodiments of connector assembly 200 can be configured to hold other types of fiber optic or copper cable connectors in a quad connector arrangement without departing from the scope of one or more embodiments.

Figure 3:
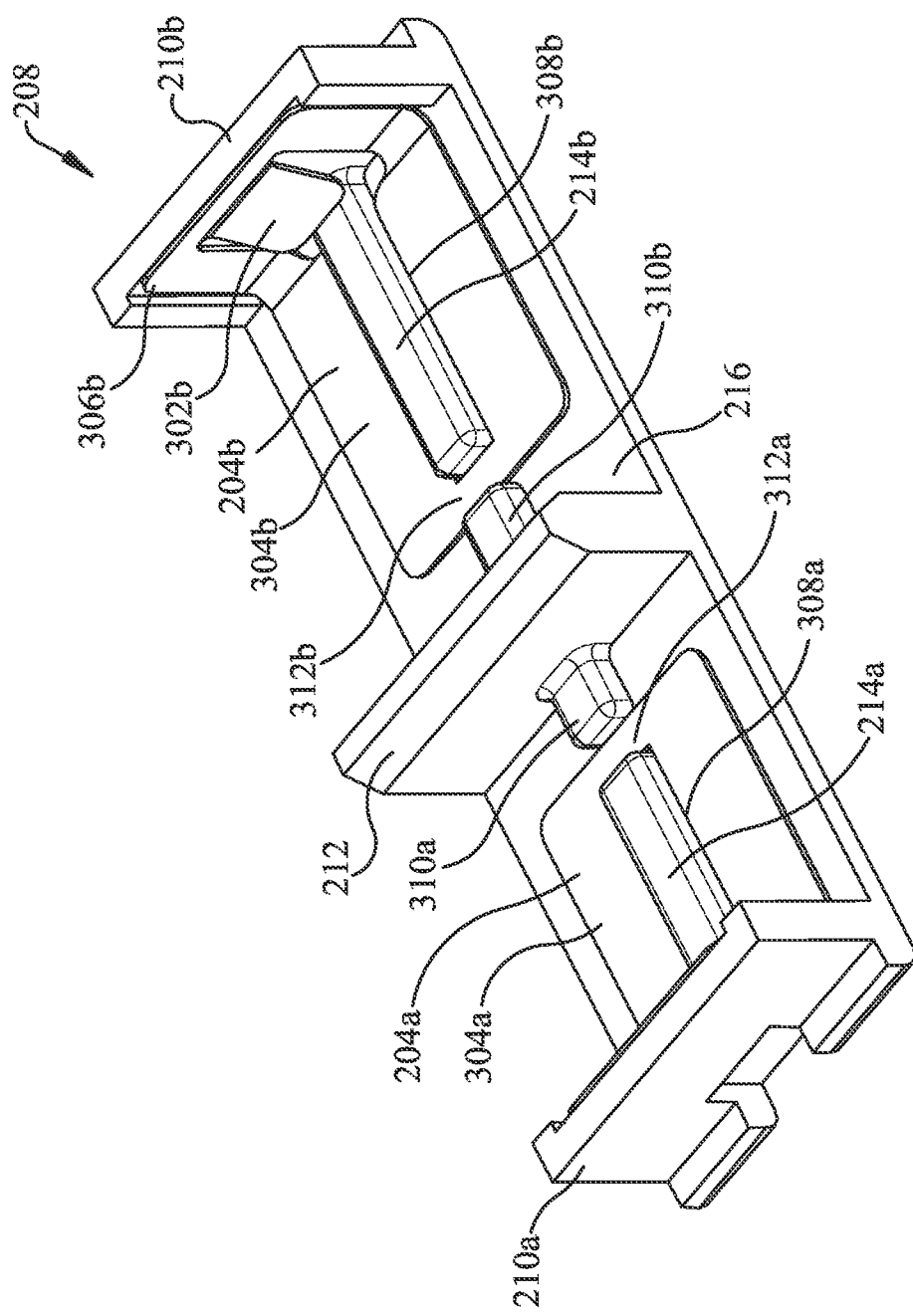
FIG. 3 is a perspective view of a bottom clip with two springs attached.

Optical fiber cables 220a-220d are connected to the respective simplex connectors 206a-206b, with the optical fiber of each cable 220a-220d terminating on the ferrules (not shown in FIG. 2) inside each connector 206a-206d. The simplex connectors 206a-206d are held in a quad arrangement by an assembly comprising a top clip 202, a bottom clip 208, two springs 204a and 204b, and spacers 218a and 218b. FIG. 3 is a perspective view of the bottom clip 208 with the two springs 204a and 204b attached. Bottom clip 208 comprises a substantially rectangular base plate 216 with two vertical end walls 210a and 210b that extend from the base plate 216 at or near the respective ends of the base plate 216. A vertical dividing wall 212 also extends from the base plate 216 at or near the middle of the base plate 216. In some embodiments, the dividing wall 212 can be located along the length of the base plate 216 at a location substantially half-way between the two end walls 210a and 210b. Alternatively, in some embodiments the dividing wall 212 can be disposed at a location that is offset from the half-way position between the two end walls 210a and 210b to allow the bottom clip 208 to accommodate a middle wall of a corresponding top clip, as will be discussed in more detail below. The chamber defined by the first end wall 210a, the base plate 216, and the dividing wall 212 will hold two of the simplex connectors 206a and 206b, while the chamber defined by the second end wall 210b, the base plate 216, and the dividing wall will hold the other two of the simplex connectors 206c and 206d.

Each of the springs 204a and 204b comprises a flexible rectangular metal sheet that is bent at a substantially right angle to form a horizontal section 304a, 304b and a vertical section 306a, 306b. The bend of each spring 204a, 204b is located nearer to one end of the spring 204a, 204b than the other end, such that the horizontal section 304 is longer than the vertical section 306. Spring 204b resides within the chamber defined by the second end wall 210b, the base plate 216, and the dividing wall 212, such that the horizontal section 304b of the spring 204b rests on the base plate 216 and the vertical section 306b of the spring 204b rests against the end wall 210b. Similarly, spring 204a resides within the chamber defined by the first end wall 210a, the base plate 216, and the dividing wall 212, such that the horizontal section 304a of the spring 204a rests on the base plate 216 and the vertical section 306a (not visible in FIG. 3) of the spring 204a rests against the end wall 210a.

A slot 308 is formed in each of the vertical sections 306a, 306b of the springs 204a, 204b. These slots 308a, 308b are sized to accommodate respective elongated rails 214a, 214b formed on the base plate 216. The rails 214a, 214b extend from respective end walls 210a, 210b along the base plate 216 in the lengthwise direction, ending at a location part way between the respective end walls 210a, 210b and the dividing wall 210. Two short raised sections 310a and 310b are also formed on the base plate 216, extending from the respective two sides of the dividing wall 212. The positions and lengths of these short raised sections 310a, 310b are such that a gap is formed between each rail 214a, 214b and its corresponding short raised section 310a, 310b.

The springs 204a, 204b are disposed on the bottom clip 208 such that the rails 214a, 214b are accommodated in the respective slots 308a, 308b of the springs 204a, 204b and the portion 312a, 312b of each horizontal section 304a, 304b that extends beyond the slot 308a, 308b resides in the gap formed between the rail 214a, 214b and its corresponding short raised section 310a, 310b. This arrangement prevents lateral sliding movement of the springs 204a and 204b and properly orients the springs 204a, 204b within their respective chambers of the bottom clip 208.

A spring mechanism 302a, 302b is formed on the vertical section 306a, 306b of each spring 204a, 204b. In the example depicted in FIG. 3, the spring mechanism 302a, 302b comprises a square portion of the vertical section 306a, 306b that is cut away from the main body of the vertical section 306a, 306b on its left, right, and bottom edges while remaining connected to the vertical section 306a, 306b on its top edge. Each spring mechanism 302a, 302b is bent away from its corresponding end wall 210a, 210b about the top edge, which acts as a hinge for the spring mechanism 302a, 302b. In response to application of a force, the flexible spring mechanism 302a, 302b bends about its top edge toward its corresponding end wall 210a, 210b and applies an opposing force toward the middle of the bottom clip 208 (in the direction of the dividing wall 212).

The design of springs 204a. 204b illustrated in FIG. 3 is only intended to be exemplary, and it is to be appreciated that any suitable spring mechanism capable of applying a counteracting force directed toward the dividing wall 212 in response to application of a force on the spring mechanism directed toward the end walls 210a, 210b is within the scope of one or more embodiments of this disclosure. For example, in some embodiments, springs 204a and 204b can be replaced with foam padding affixed to the interior surfaces of the end walls 210a and 210b. In still other embodiments, springs 204a and 204b can be replaced with flexible wire spring clips be affixed to the end walls 210a and 210b.

Figure 4:
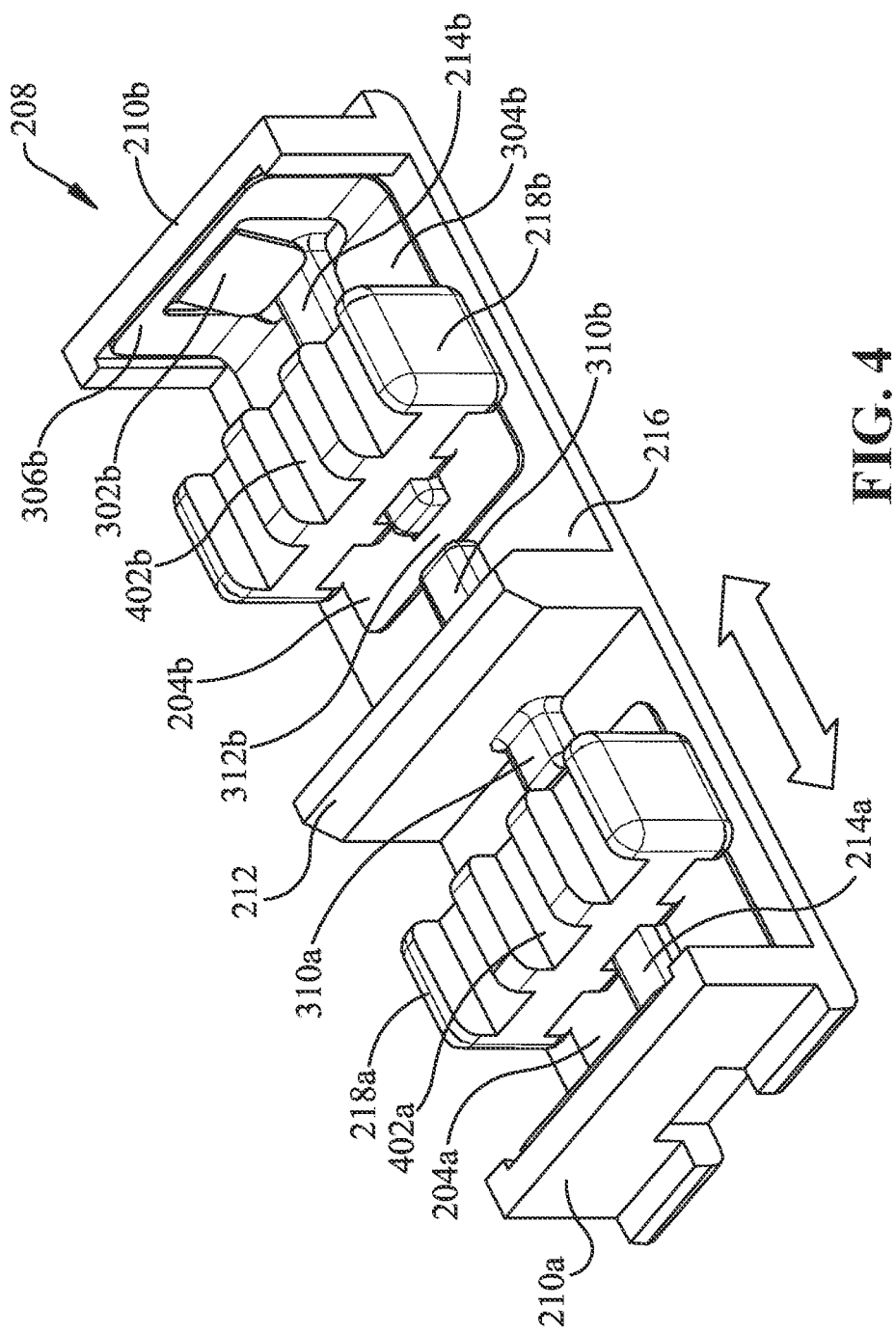
FIG. 4 is a perspective view of the bottom clip with spacers installed.

FIG. 4 is a perspective view of the bottom clip 208 with spacers 218a, 218b installed. In the illustrated embodiment, spacers 218a, 218b comprise elongated blocks having grooves formed on two opposing long sides in the widthwise direction (across the widths of the spacers 218a, 218b). The spacers 218a and 218b are installed in the respective two chambers of the bottom clip 208. When a spacer 218 is installed in this manner, one groove 402 on the bottom side of the spacer 218 accommodates the rail 214 of the base plate 216 located in the corresponding chamber of the bottom clip 208. This arrangement allows each spacer 218a and 218b to slide within the bottom clip 208 along its respective rail 214a, 214b (in the directions indicated by the arrow in FIG. 4) while preventing the spacers 218a and 218b from sliding in the direction orthogonal to the rails 214a, 214b.

End walls 210a, 210b, dividing wall 212, and spacers 218a, 218b define four separate chambers in which the four simplex connectors 206a-206d can respectively reside. Specifically, a first chamber is defined between end wall 210a and spacer 402a, a second chamber is defined between spacer 402a and dividing wall 212, a third chamber is defined between dividing wall 212 and spacer 402b, and a fourth chamber is defined between spacer 402b and end wall 210b.

Figure 5:
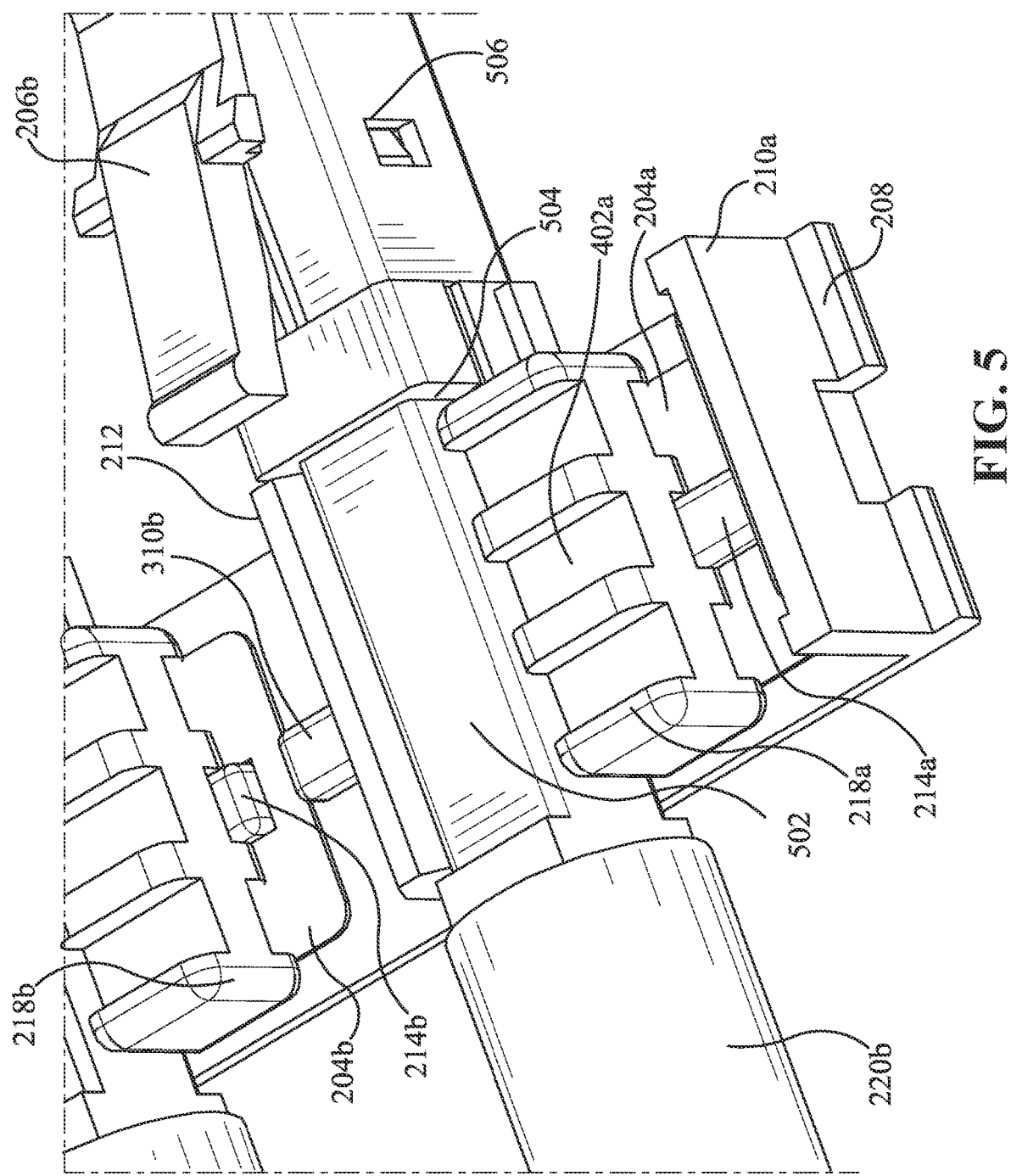
FIG. 5 is a close-up view of a partially assembled quad connector in which a simplex connector has been installed in the second chamber between a spacer and a dividing wall.

FIG. 5 is a close-up view of the partially assembled quad connector in which simplex connector 206b has been installed in the second chamber between the spacer 402a and dividing wall 212. As illustrated in this figure, the body of the simplex connector 206b comprises a narrow section 502 located behind the front plug section 506 of the connector 206b. The narrow section 502 has cross-sectional dimensions that are smaller than those of the front plug section 506, resulting in a rear-facing lip 504 at the point of transition between the front plug section 506 and the narrow section 502. This rear-facing lip 504 abuts against the front-facing side of the spacer 218a, as well as the front edge of the bottom clip 208, thereby preventing the simplex connector 206b from sliding backward across the bottom clip 208.

Figure 6:
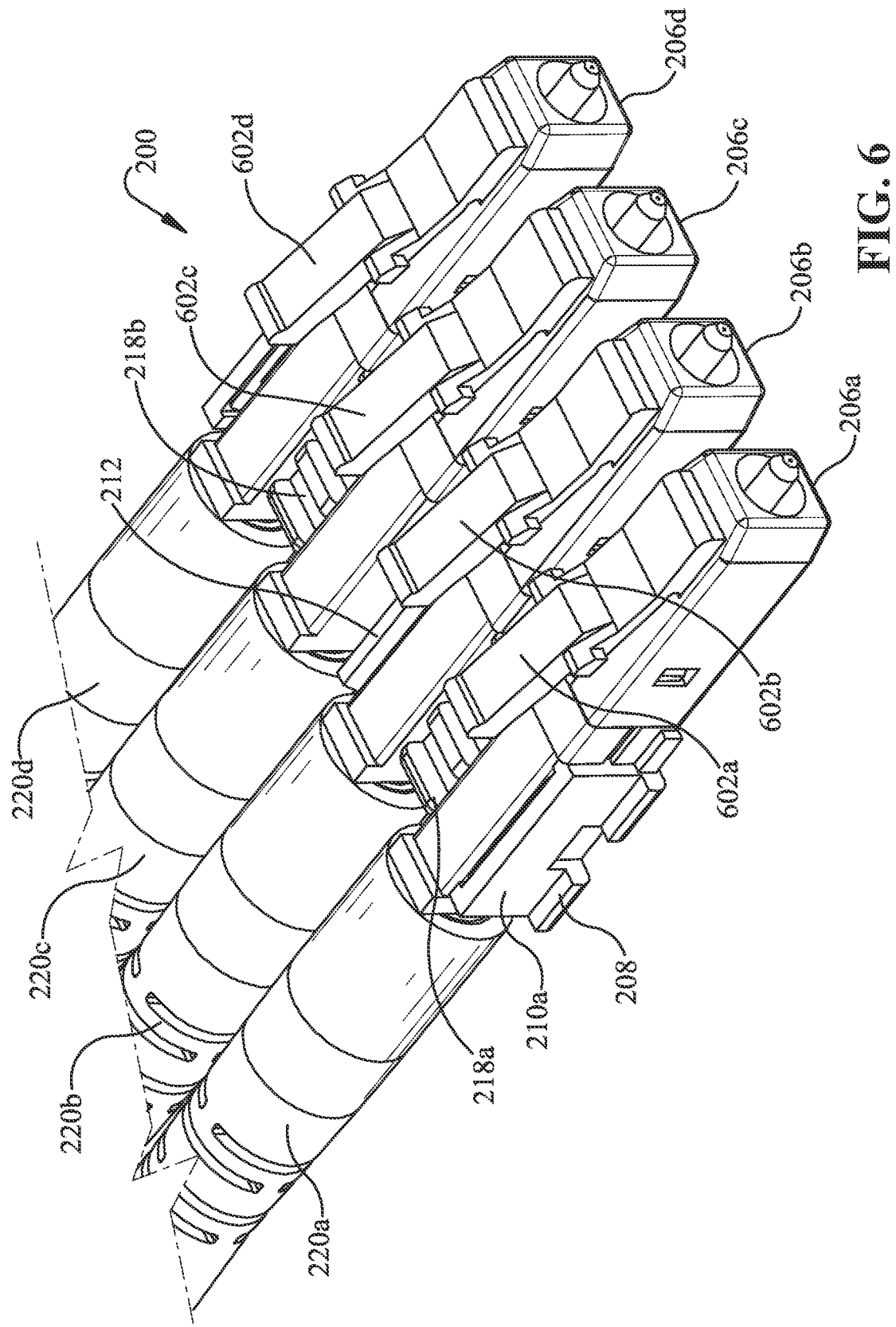
FIG. 6 is a perspective view of a partially assembled quad connector assembly in which four simplex connectors have been installed in the respective chambers of the bottom clip.
Figure 7:
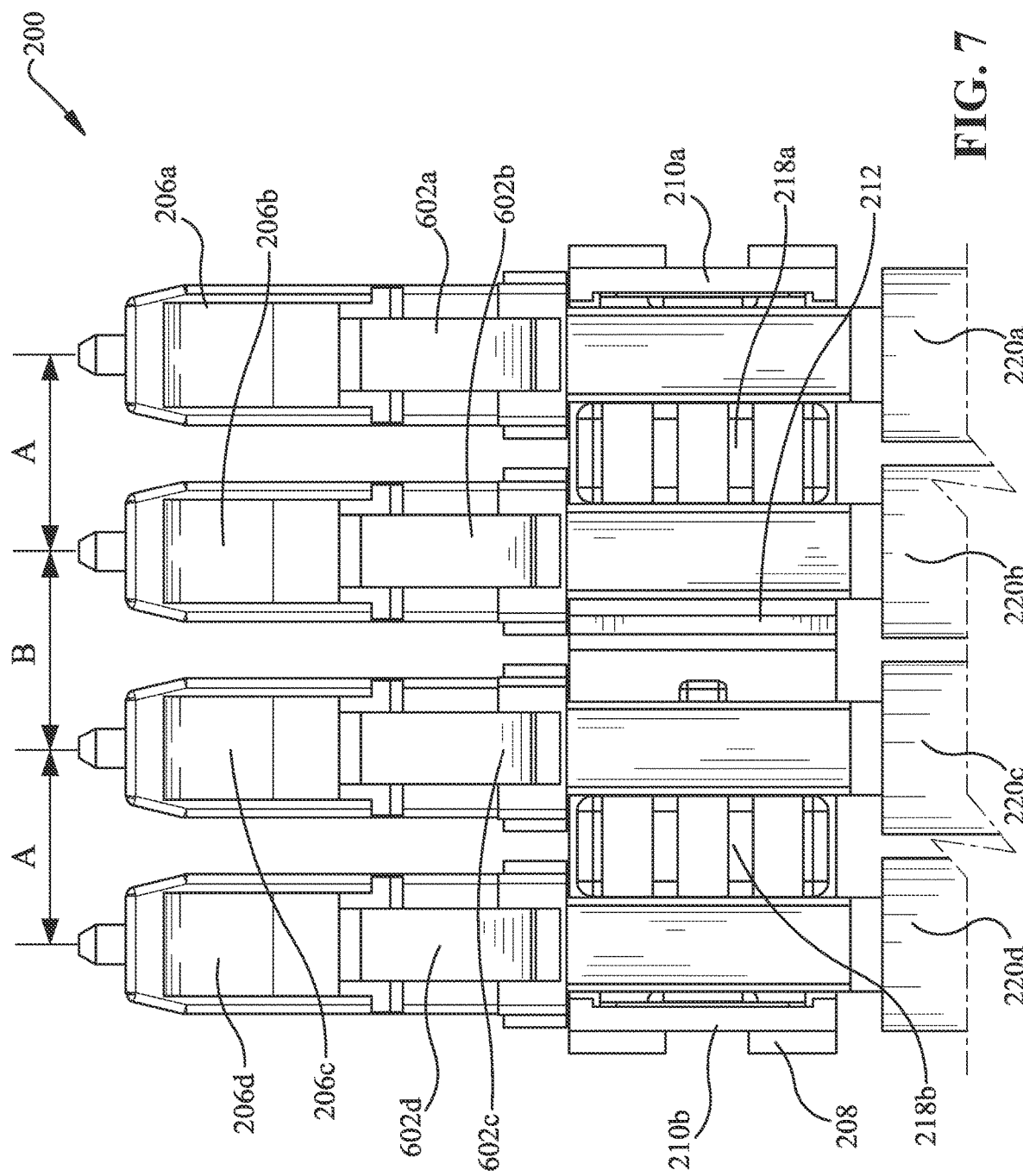
FIG. 7 is a top view of a partially assembled quad connector assembly with four simplex connectors installed in respective chambers of the assembly.

FIG. 6 is a perspective view of the partially assembled quad connector assembly 200 in which all four simplex connectors 206a-206d have been installed in the respective chambers of the bottom clip 208. FIG. 7 is a top view of the partially assembled quad connector assembly 200 with the four simplex connectors 206a-206b installed in the respective chambers. The quad connector assembly 200 holds the connectors 206a-206d in a linear formation with the front ends of the connectors 206a-206d substantially flush with one another. As can be seen these views, the first pair of simplex connectors 206a and 206b are separated from one another by spacer 218a, while the second pair of simplex connectors 206c and 206d are separated from one another by spacer 218b. The widths of spacers 218a and 218b can be such that, when the connectors 206a-206d are abutted against the spacers 218a and 218b as shown in FIGS. 6 and 7, the distances A between connectors 206a and 206b and between connectors 206c and 206d are substantially equal to a standardized ferrule distance for duplex connectors (e.g., approximately 6.25 millimeters in some embodiments).

Figure 8:
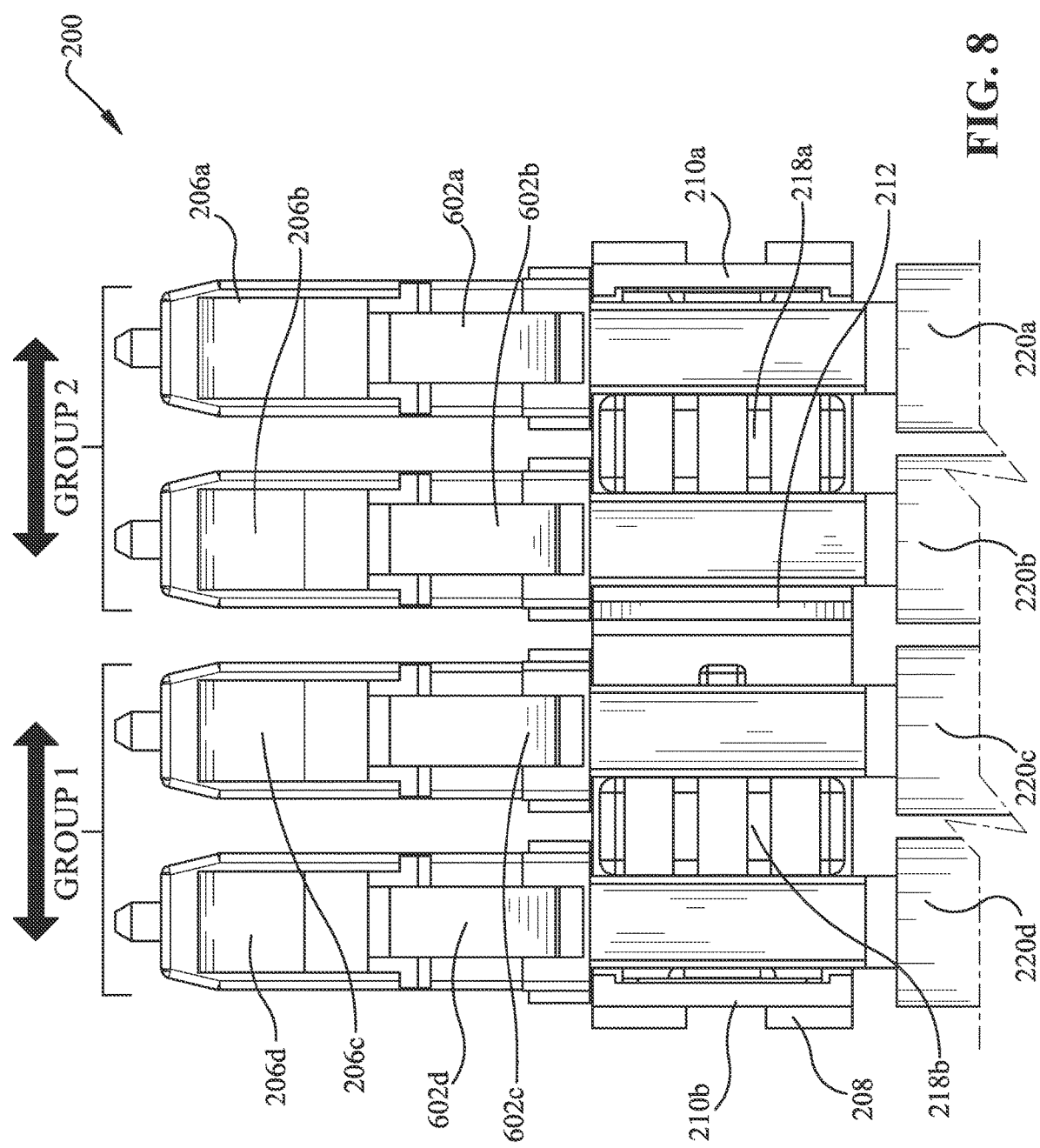
FIG. 8 is a top view of a partially assembled quad connector assembly illustrating freedom of movement of the simplex connectors within the bottom clip of the assembly.

FIG. 8 is a top view of the partially assembled quad connector assembly 200 illustrating freedom of movement of the simplex connectors 206a-206d within the bottom clip 208. The distance between end wall 210a and dividing wall 212 of the bottom clip 208 is greater than the sum of the widths of connector 206a, connector 206b, and spacer 218a. Similarly, the distance between end wall 210b and dividing wall 212 is greater than the sum of the widths of connector 206c, connector 206d, and spacer 218b. These spacings allow connector 206c, connector 206d, and spacer 218b to slide together as a group (labeled Group 1 in FIG. 8) between end wall 210b and dividing wall 212 as the spacer 218b slides along rail 214b, as discussed above in connection with FIG. 4. That is, the connector group can slide within the bottom clip 208 in a direction orthogonal to the lengths of the connectors 206. Similarly, connector 206a, connector 206b, and spacer 218a can slide freely as a group (Group 2 in FIG. 8) between end wall 210a and dividing wall 212 as spacer 218b slides along rail 214a. Each of the two connector groups can slide independently of one another. This configuration allows the distance B between the middle connectors 206b and 206c to be changed by sliding one or both of the Group 1 connector pair or Group 2 connector pair within the bottom clip 208. Since the spacers 218a, 218b maintain a fixed distance A between connectors 206a and 206b, and between connectors 206c and 206d, the two connector pairs designated as Group 1 and Group 2 can be considered two standard duplex connectors having a fixed ferrule distance A, which can slide independently of one another within the bottom clip 208 to vary the distance B between the two duplex connectors.

The minimum value of distance B between the two connector groups is determined by the thickness of dividing wall 212 (or, in some embodiments, by the sum of the thicknesses of dividing wall 212 and the middle wall of the top clip, as will be described below). This minimum value of distance B is achieved by positioning both connector groups to abut against the dividing wall 212. In some embodiments, the spring mechanisms 302a and 302b (see FIG. 3) can apply a force to the two end connectors 206a and 206d that, in the absence of a counteracting force, pushes the two connector groups against the dividing wall 212 (with connectors 206b and 206c abutted against the dividing wall 212) as a default positioning. In some embodiments, the bottom clip 208 can be configured such that this minimum value of distance B is equal to the fixed distances A of the two connector groups (that is A=B). This orientation is suitable for quad adapters 100 in which the spacing between adjacent ports is equal for all pairs of adjacent ports.

If the quad connector assembly 200 is to be plugged into a quad adapter 100 in which the distance B between the two middle ports 102b and 102c (see FIG. 1) is greater than the distances A, one or both of connector Group 1 or connector Group 2 can be repositioned by sliding the group away from the dividing wall 212. To this end, a force can be applied to either of the two connector groups that counteracts the force applied to the group by its corresponding spring mechanism 302, allowing the distance B to be increased until the connectors 206a-206d of the connector assembly 200 are aligned with the ports 102a-206d, allowing the connector assembly 200 to be plugged into the adapter 100.

Figure 9:
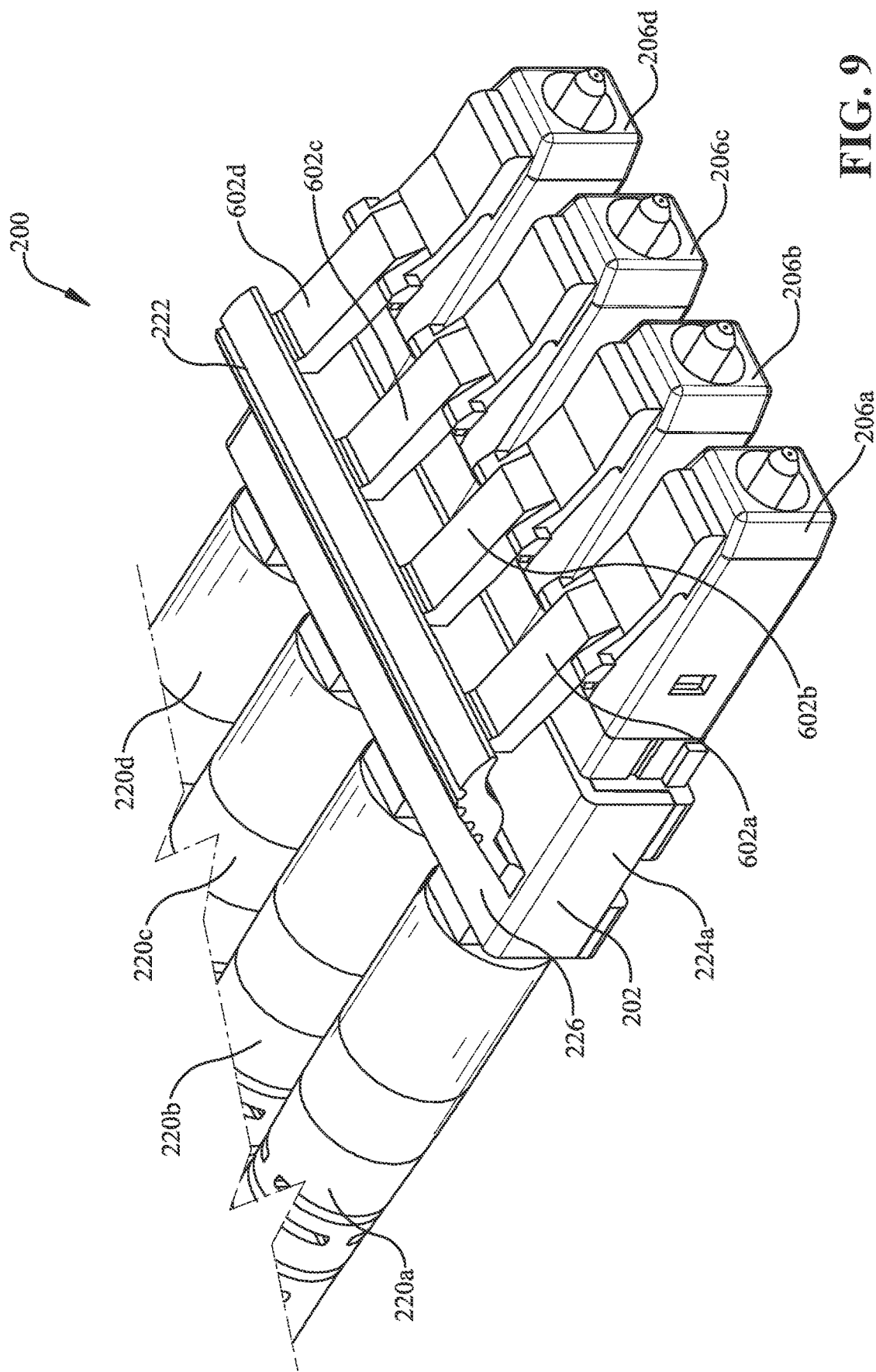
FIG. 9 is a perspective view of a quad connector assembly with its top clip in place.
Figure 10:
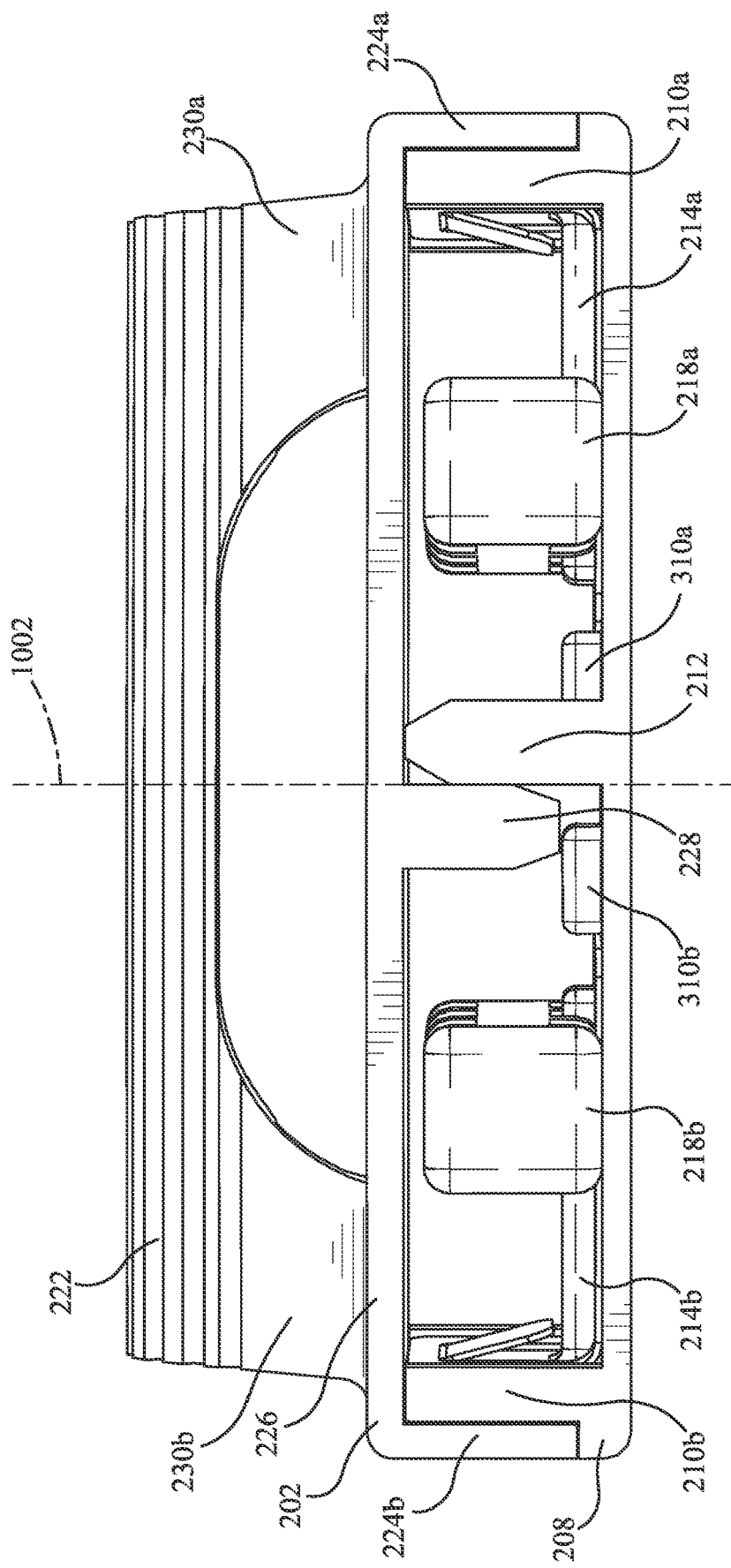
FIG. 10 is a rear view of a top clip engaged with a bottom clip.

FIG. 9 is a perspective view of the quad connector assembly 200 with the top clip 202 in place. FIG. 10 is a rear view of the top clip 202 engaged with the bottom clip 208 with the simplex connectors 206a-206d omitted for clarity. Top clip 202 comprises a rectangular top wall 226 and two outer end walls 224a and 224b that extend from the opposing short edges of the top wall 226 at right angles to the top wall 226. A top bar 222 is also attached to the outer surface of the top wall 226 of the top clip 202. The top bar 222 is attached to the top wall 226 by two flexible arms 230a and 230b that extend from the top wall 226 at an angle relative to the surface of the top wall 226. In some embodiments, top clip 202 also includes a middle wall 228 that extends from an inner surface of the top wall 226 at a right angle relative to the inner surface.

Top clip 202 is configured to engage with the bottom clip 208, yielding a housing assembly or enclosure that houses the springs 204a, 204b, the spacers 218a, 218b, and the narrow sections 502 of the simplex connectors 206a-206d. While engaged, the outer end walls 224a and 224b overlap with the end walls 210a and 210b, respectively, of the bottom clip 208, as shown in FIG. 10.

In embodiments in which the top clip 202 includes a middle wall 228, this middle wall 228 can abut against the dividing wall 212 of the bottom clip 208 while the top clip 202 and the bottom clip 208 are engaged. To accommodate the middle wall 228, the bottom clip 208 can be designed such that its dividing wall 212 is offset from a centerline 1002 that bisects the front profile of the assembled clips 202 and 208, such that the dividing wall 212 is closer to end wall 210a than to end wall 210b. Similarly, the middle wall 228 of the top clip 202 can be offset from the centerline 1002 in the opposite direction, such that the middle wall 228 is closer to outer end wall 224b than to outer end wall 224a. This arrangement places the point of contact between the middle wall 228 and the dividing wall 212 at or approximately at the centerline 1002. Thus, the middle wall 228 of the top clip 202 and the dividing wall 212 of the bottom clip form an aggregate dividing wall between the Group 1 connectors 202c, 202d and the Group 2 connectors 202a, 202b. In this embodiment, the minimum value of distance B is determined by the combined widths of dividing wall 212 and middle wall 228. This minimum value of distance B is achieved when the Group 1 duplex connector (comprising connectors 206c and 206d) is abutted against middle wall 228, and the Group 2 duplex connector (comprising connectors 206a and 206b) is abutted against the dividing wall 212. When no external force is applied, the spring mechanisms 302a and 302b can apply a force that holds the two groups of connectors in this default position. As noted above, the distance B can be increased from this minimum distance by sliding one or both of the two groups of connectors away from this aggregate dividing wall.

The housings of simplex connectors 206a-206d include elastic latches 602a-602d formed on their top surfaces that serve to latch the connectors within ports 102a-102d while plugged into the adapter 100. When the quad connector assembly 200 is mated with an adapter 100, the upward spring force of the cantilevered latches 602a-602d cause the latches 602a-602d to remain engaged with corresponding latching features in the ports 102a-102d. Applying a downward pressure on the latches 602a-602d causes the latches 602a-602d to disengage from the latching features of the ports 102a-102d, thereby allowing the connectors 206a-206d to be removed.

When the top clip 202 is engaged with the bottom clip 208, the top bar 222 is positioned over, and makes contact with, latches 602a-602d, as shown in FIG. 9. This arrangement allows all four connectors 206a-206d to be unlatched quickly and easily from their respective ports 102a-102d by pressing down on the top bar 222, which bends the four latches 602a-602d downward into their unlatch positions. The entire quad connector assembly 200 can then be removed from the adapter 100 as a collective unit.

Figure 11:
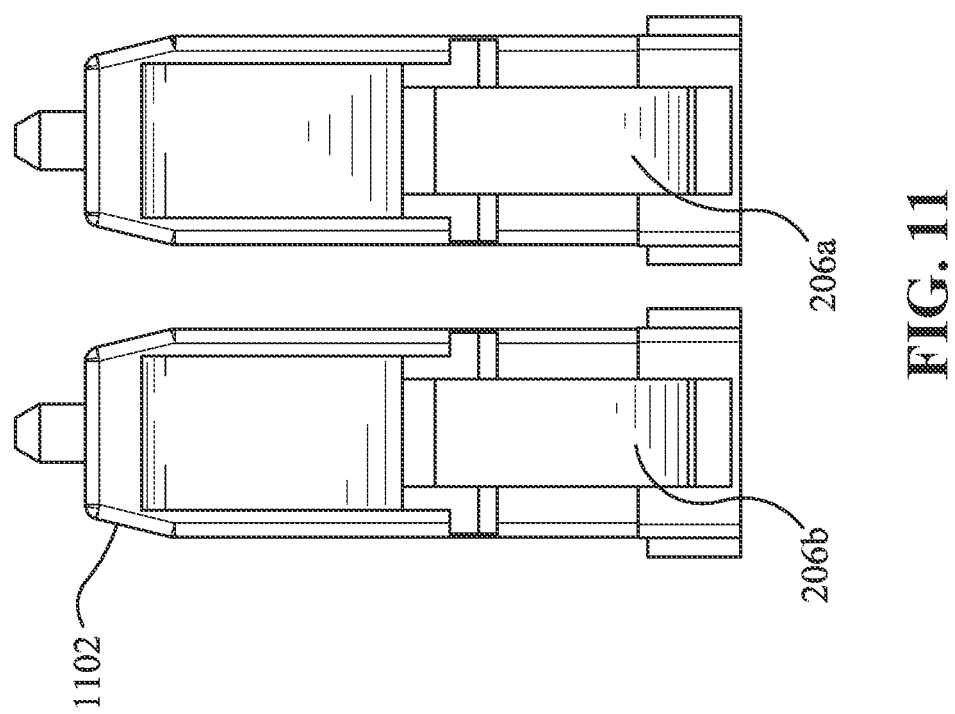
FIG. 11 is a top view of two simplex connectors with chamfered front corners.

In some embodiments, the simplex connectors 206a-206d used in the quad connector assembly 200 can comprise chamfered front corners to ease entry into the corresponding ports 102a-102d of adapter 100. FIG. 11 is a top view of two simplex connectors 206a and 206b with chamfered front corners 1102. As shown in this figure, chamfered front corners 1102 can serve as an alternative to squared front corners, and can assist in guiding the connectors 206a-206d into their corresponding ports 102a-102d. This feature can be particularly useful when the connectors 206a-206d are assembled into the quad connector arrangement using assembly 200.

While the quad connector assembly 200 has been described and illustrated with reference to a specific embodiment, aspects of the illustrated design can be modified without departing from the scope of one or more embodiments. For example, rather than using four simplex connectors 206a-206d and two spacers 218a and 218b to maintain the fixed distance A for Group 1 and Group 2, the bottom clip 208 and top clip 202 can be configured to accommodate and hold two unibody duplex connectors in a quad arrangement, while allowing the two duplex connectors to slide within the assembly to thereby adjust distance B between the two duplex connectors as needed, depending on the spacing used by the mating adapter.

The quad connector assembly 200 described above can be used to aggregate multiple simplex fiber optic connectors to yield a composite connector that can be plugged into a multi-port fiber adapter. Other types of connector assemblies can also be used to aggregate category-rated jacks, such as RJ-45 connectors, in a similar manner. Such connector assemblies can be useful for interfacing with electronic data switches having arrays of data ports (e.g., a 2×6 array), allowing multiple connectors to be substantially simultaneously plugged into the data port array as a group.

Figure 12:
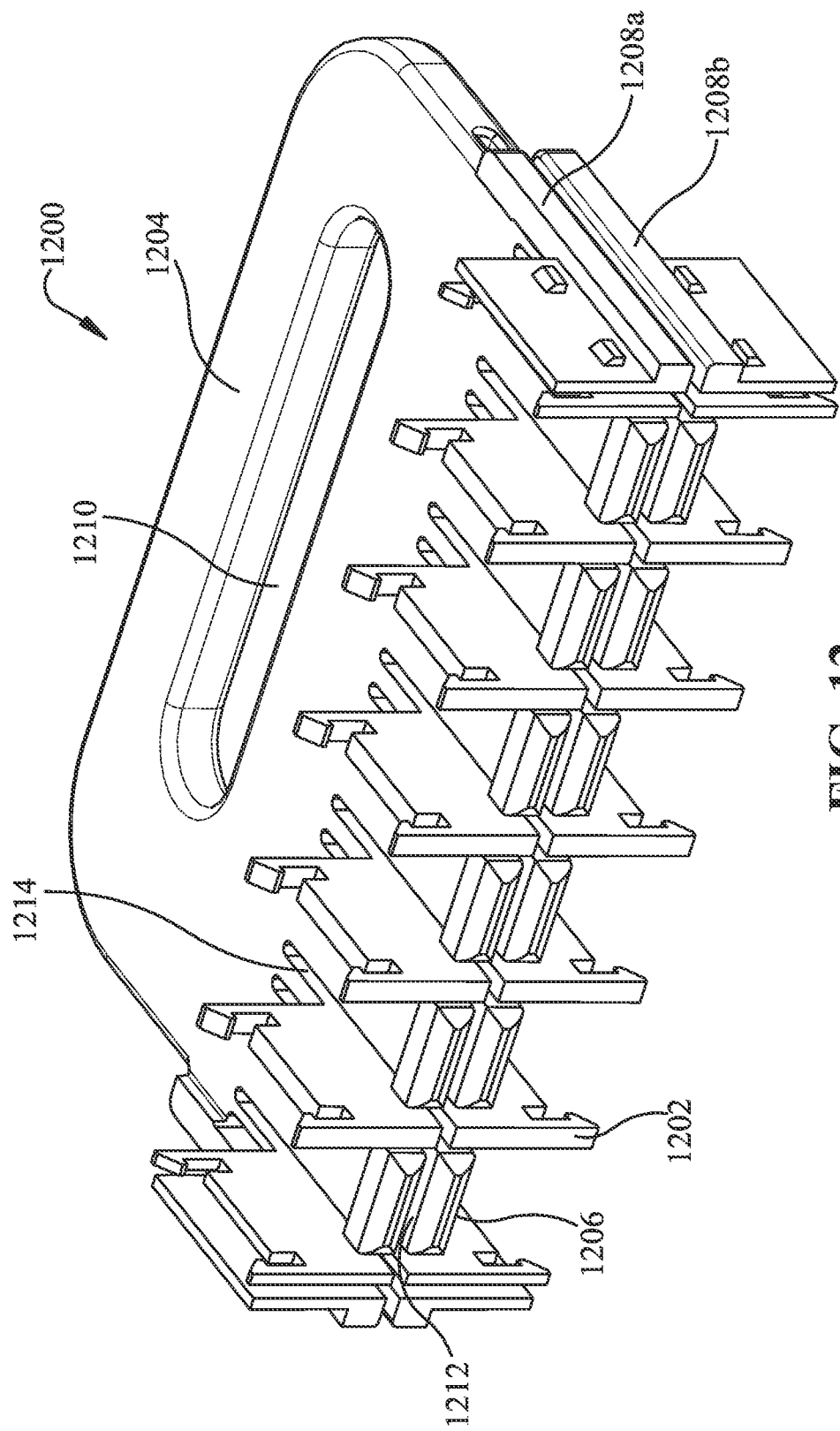
FIG. 12 is a perspective view of a middle plate that can be used as part of a segmental switch module for aggregating multiple category-rated connectors.
Figure 13:
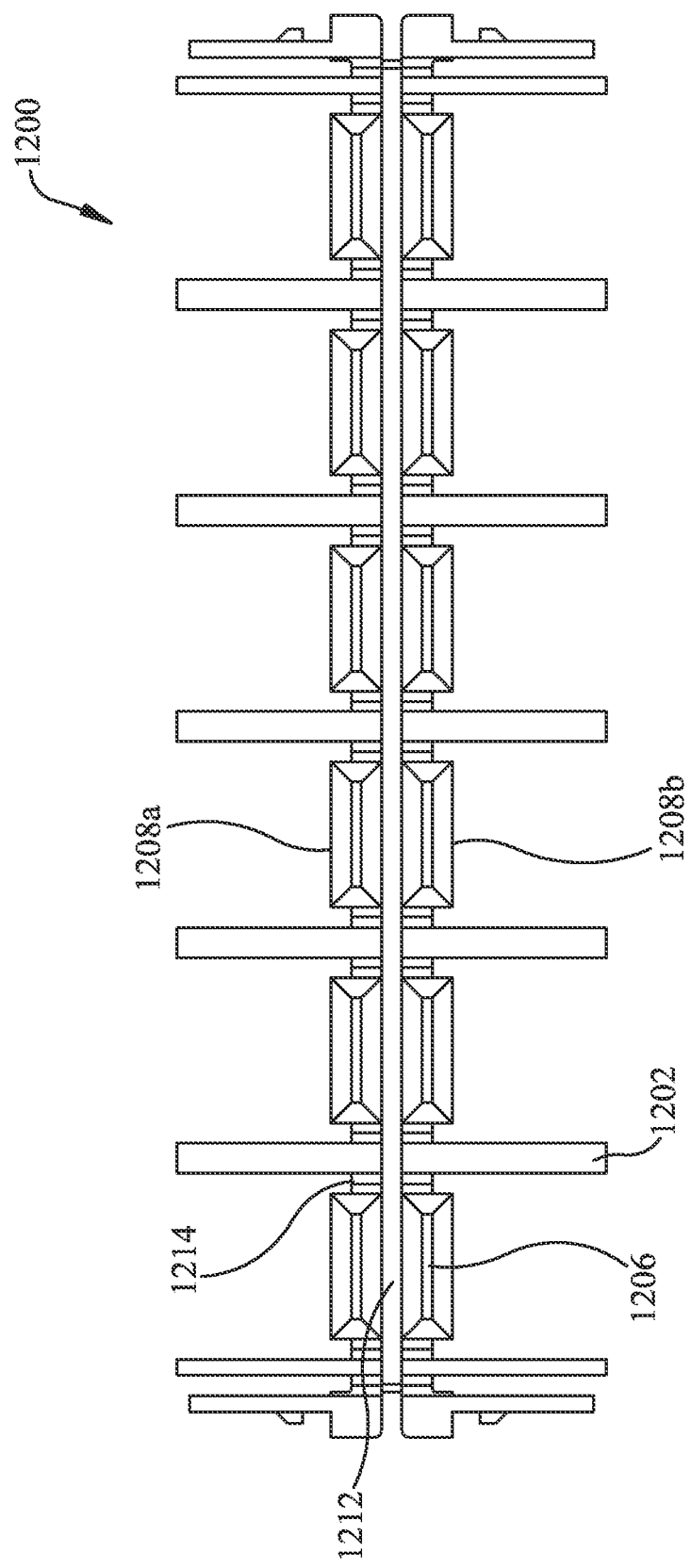
FIG. 13 is a front view of the middle plate.
Figure 14:
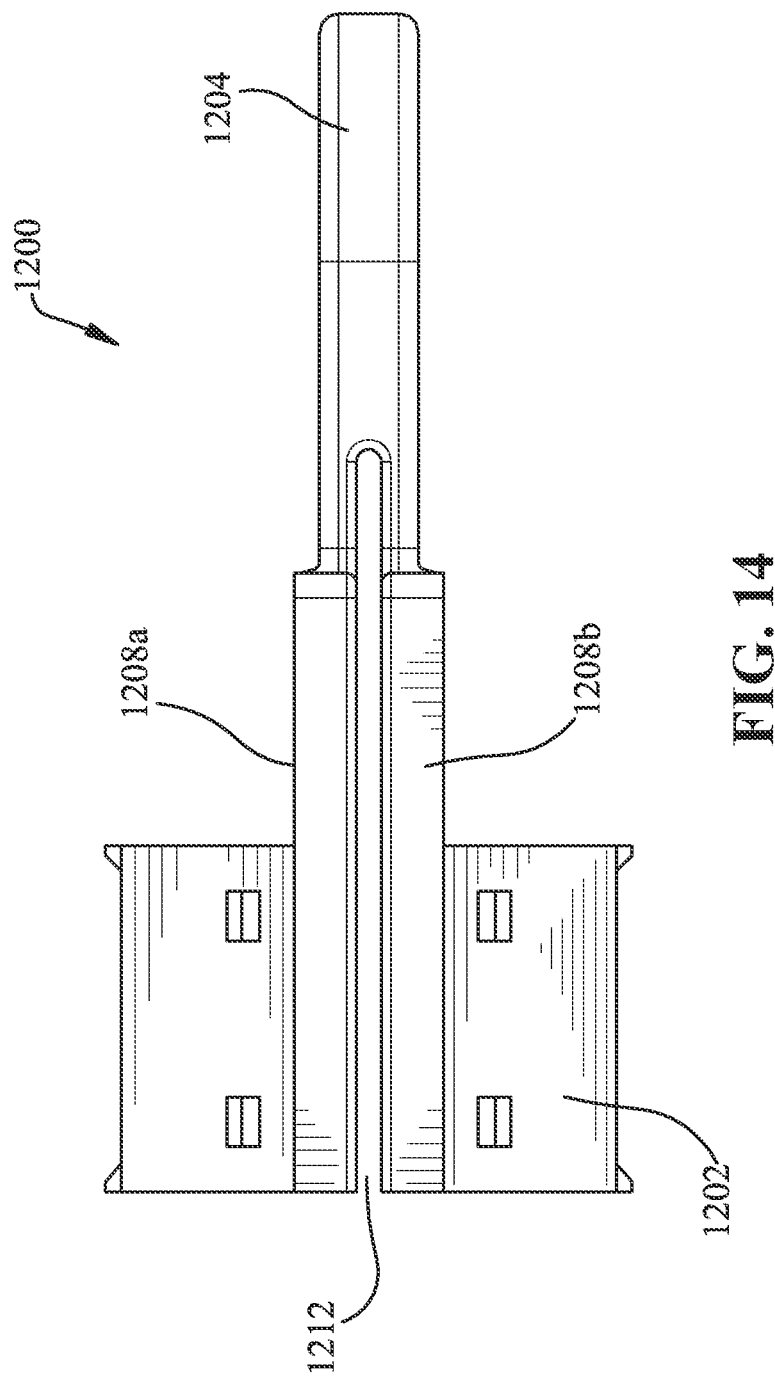
FIG. 14 is a side view of the middle plate.
Figure 15:
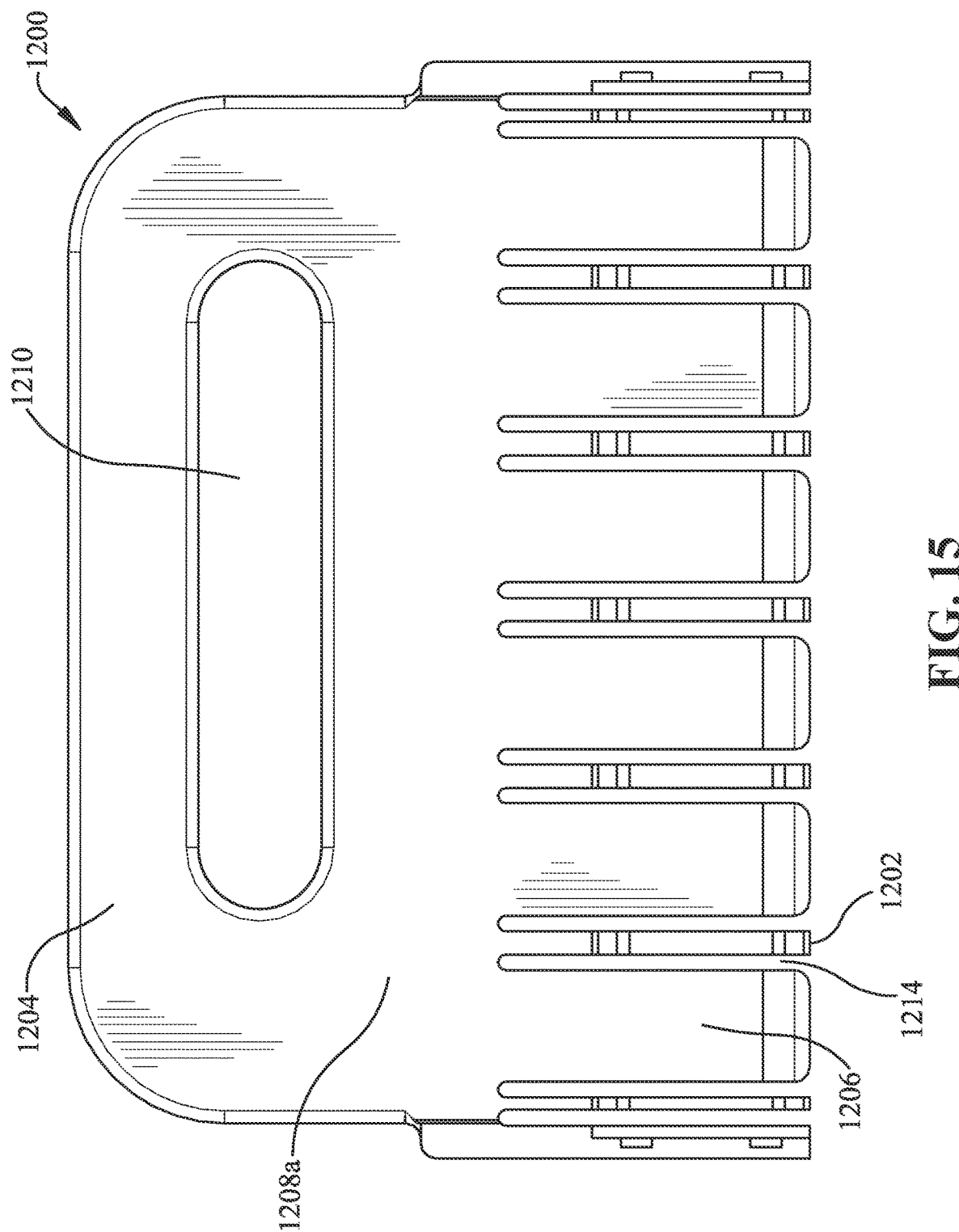
FIG. 15 is a top view of the middle plate.

FIG. 12 is a perspective view of a middle plate 1200 that can be used as part of a segmental switch module for aggregating multiple category-rated connectors (e.g., CAT-5 connectors). FIG. 13 is a front view of the middle plate 1200. FIG. 14 is a side view of the middle plate 1200. FIG. 15 is a top view of the middle plate 1200. Middle plate 1200 comprises a handle section 1204 comprising a flat plate with an opening 1210 that is large enough to accept a user's fingers so that a pull force can be applied. As can be seen in FIG. 14, two mounting plates 1208a and 1208b extend in parallel from a front edge of the handle section 1204. The thickness of each mounting plate 1208a and 1208b is smaller than the thickness of the handle section 1204, resulting in a gap 1212 between the two mounting plates 1208a and 1208b that extends from the front of the middle plate 1200 to the handle section 1204.

Dividing walls 1202 are formed on the outward-facing surfaces of the two mounting plates 1208a and 1208b. These dividing walls 1202 reside within slots 1214 formed on the mounting plates 1208a and 1208b, which extend from the front edge of the mounting plates to the handle section 1204. Each dividing wall 1202 is anchored to the handle section 1204 at the end of its corresponding slot 1214. The height of each dividing wall 1202 extends perpendicular to the outward-facing surfaces of its mounting plate 1208a, 1208b, and the length of each dividing wall 1202 extends from its anchor point at the handle section 1204 to the front edge of the mounting plate 1208a. The width of each dividing wall 1202 is smaller than the width of its corresponding slot 1214, allowing the dividing wall 1202 to flex sideways within the slot 1214 (that is, orthogonal to the surface of the mounting plates 1208a, 1208b).

Figure 16:
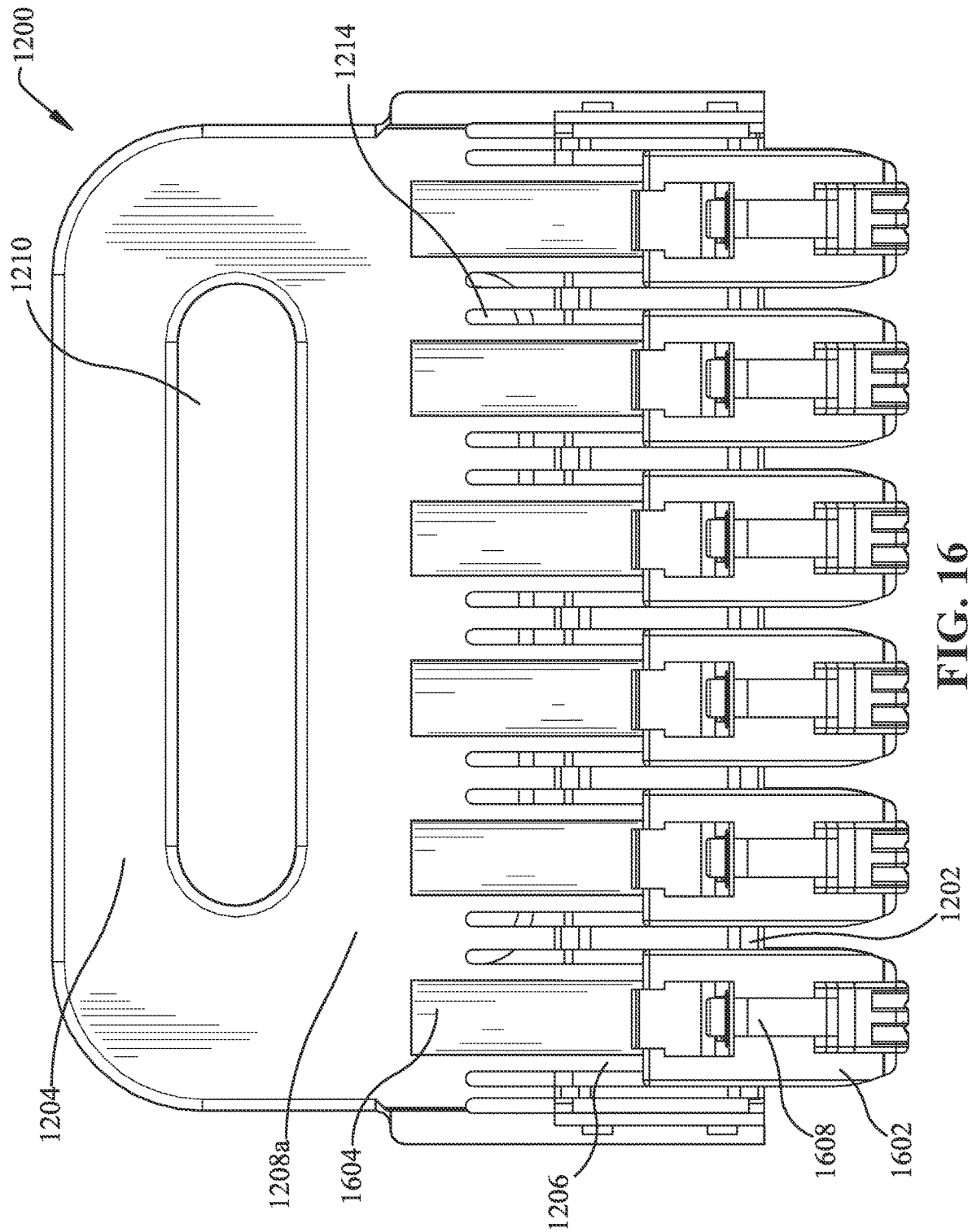
FIG. 16 is a top view of the middle plate in which connectors have been mounted on its respective flexible planks.
Figure 17:
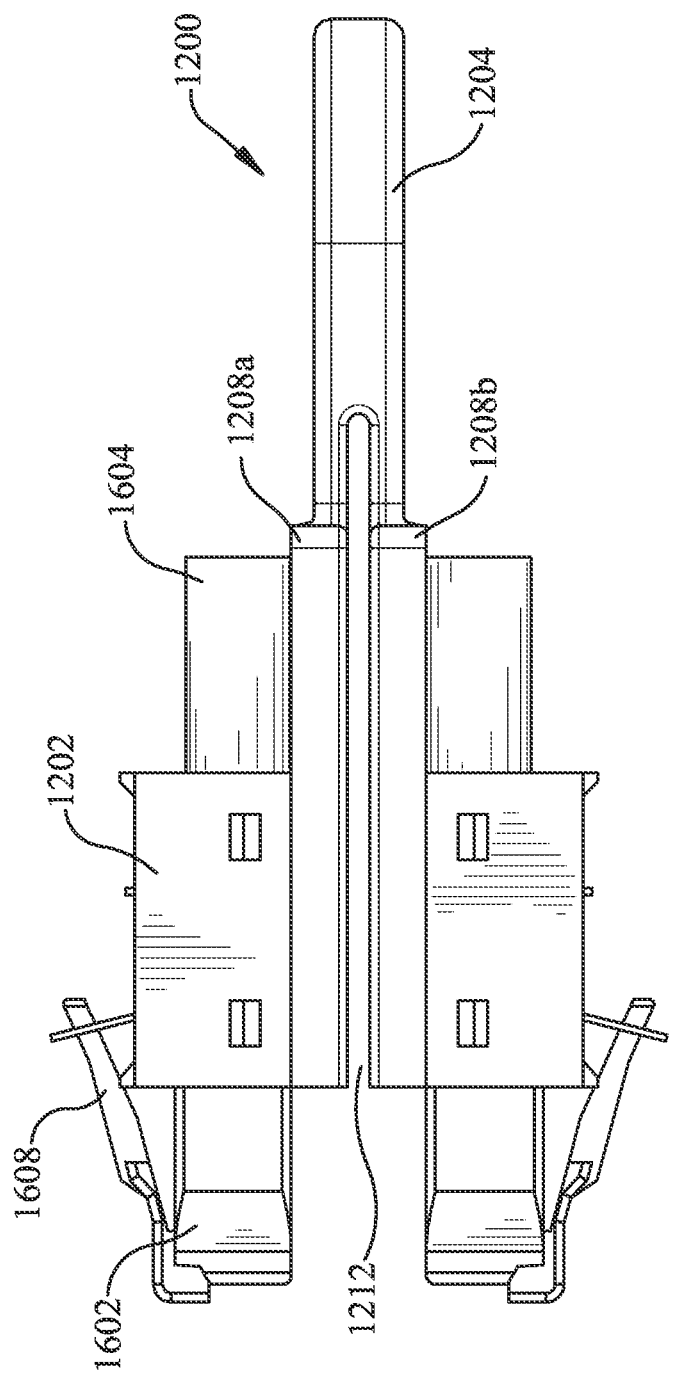
FIG. 17 is a side view of the middle plate in which connectors have been installed.

Slots 1214 divide each mounting plate 1208a, 1208b into flexible planks 1206 on which connectors can be mounted. FIG. 16 is a top view of the middle plate 1200 in which connectors 1602 have been mounted on the respective flexible planks 1206. FIG. 17 is a side view of the middle plate 1200 in which the connectors have been installed. As can be seen in these views, connectors 1602 (e.g., RJ-45 jacks or other types of connectors) are installed on each of the flexible planks 1206 between the dividing walls 1202, with each connector 1602 terminating a category cable 1604. In the illustrated example, the middle plate 1200 holds the connectors 1602 in a 2×6 array formation comprising two horizontal parallel rows of six connectors 1602, with the top row of six connectors 1602 (on mounting plate 1208a) oriented latch-up and the bottom row of six connectors 1602 (on mounting plate 1280b) oriented latch-down. This orientation conforms to that of a data port array found on many electronic data switches.

Figure 18:
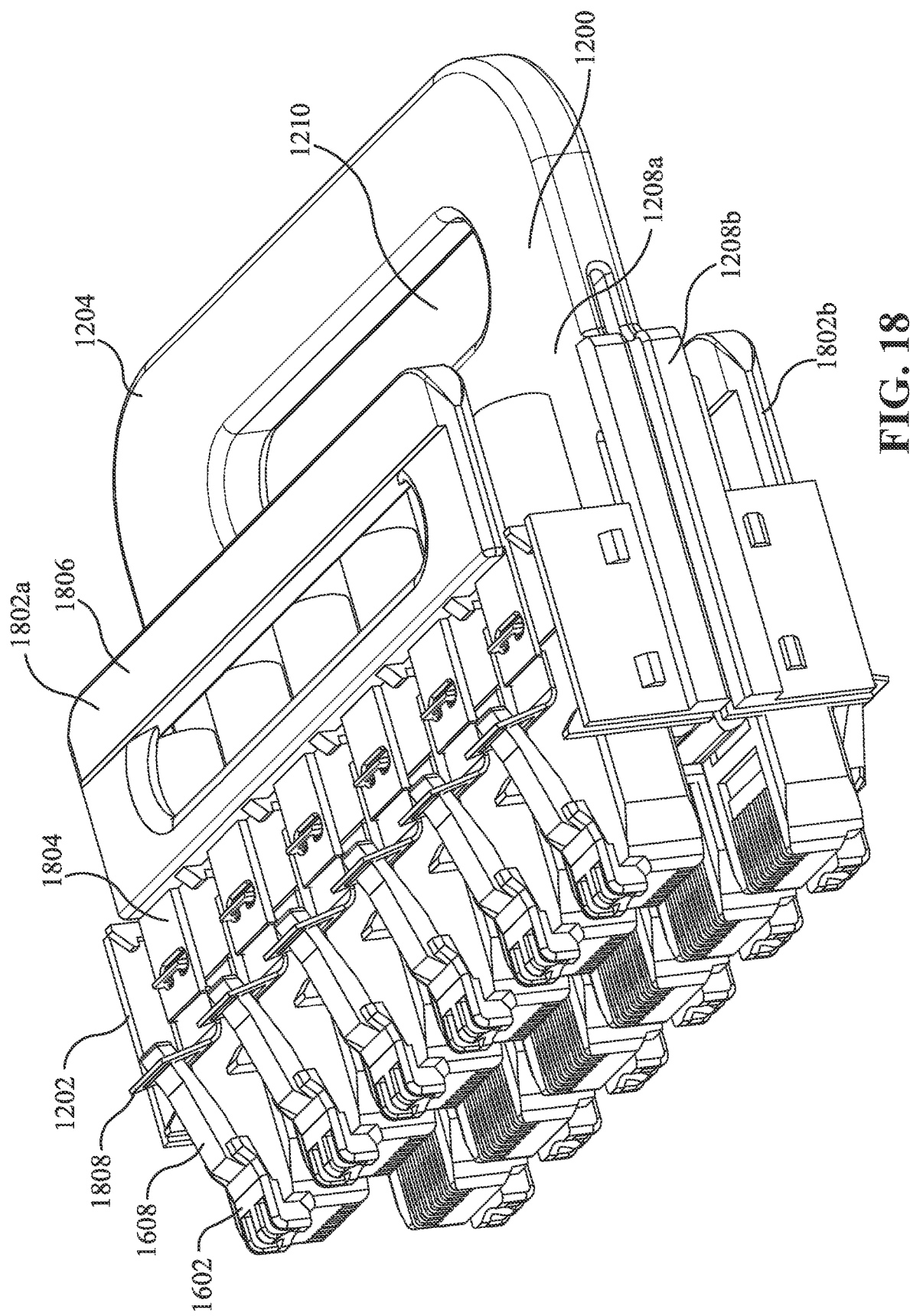
FIG. 18 is a perspective view of an assembly comprising an array of connectors mounted to the middle plate and two attachment plates installed on the connectors.

FIG. 18 is a perspective view of an assembly comprising an array of connectors 1602 mounted to the middle plate 1200 and two attachment plates 1802a and 1802b installed on the connectors 1602. Each attachment plate 1802a and 1802b is installed on one of the two rows of six connectors 1602. In this example embodiment, each attachment plate 1802a, 1802b comprises a handle 1806 and a number of attachment arms 1804 equal to the number of connectors 1602 in the row (six in the present example). Each attachment arm 1804 has an engagement feature 1808 configured to engage with a structural feature of its corresponding connector 1602. The engagement feature 1808 can be a hole that receives the latch 1608 of the connector 1602, as depicted in FIG. 18, or another such engagement feature.

Figure 19:
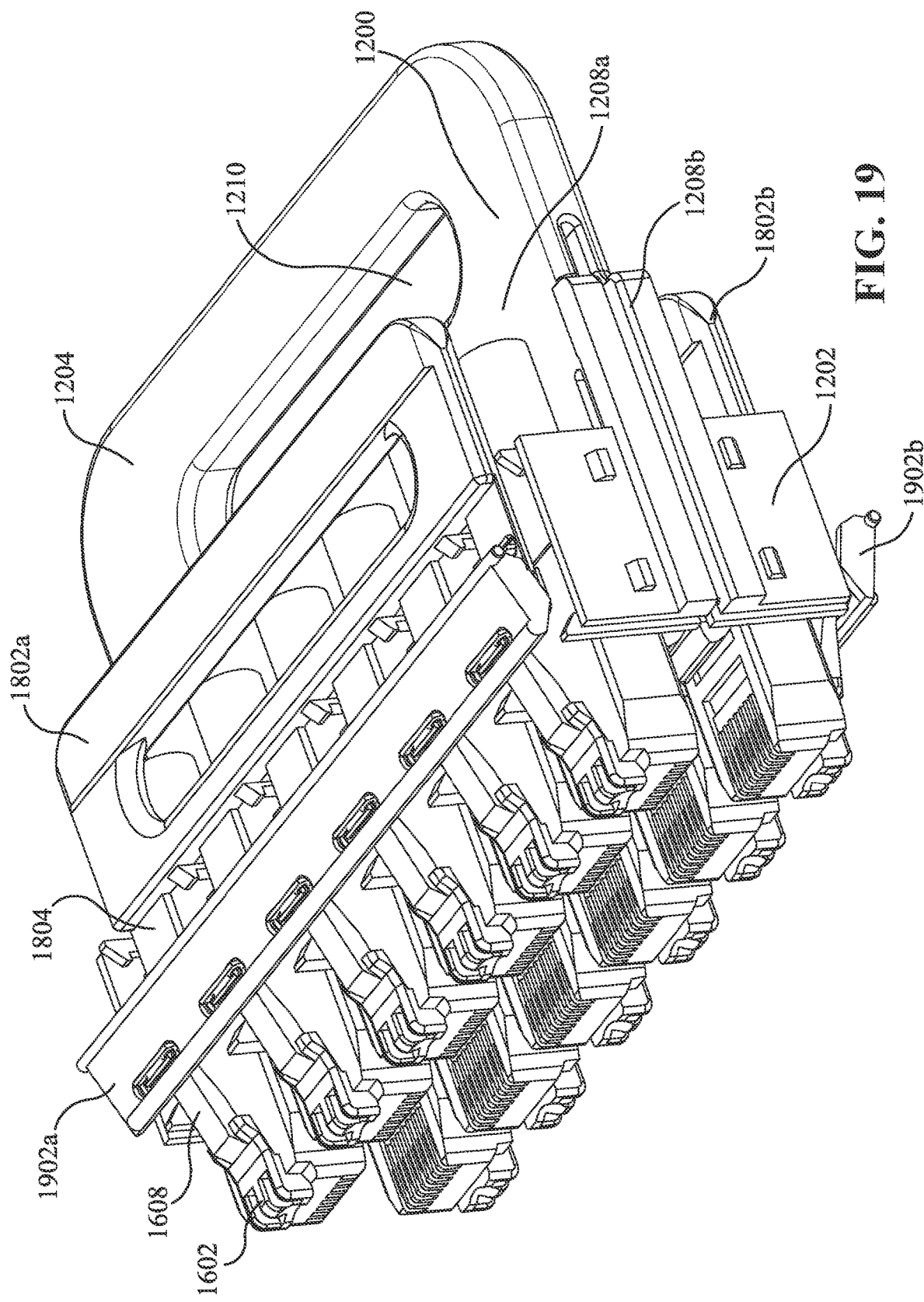
FIG. 19 is a perspective view of the assembly depicted in FIG. 18 in which two cross plates have been installed on mounting arms of the attachment plates.
Figure 20:
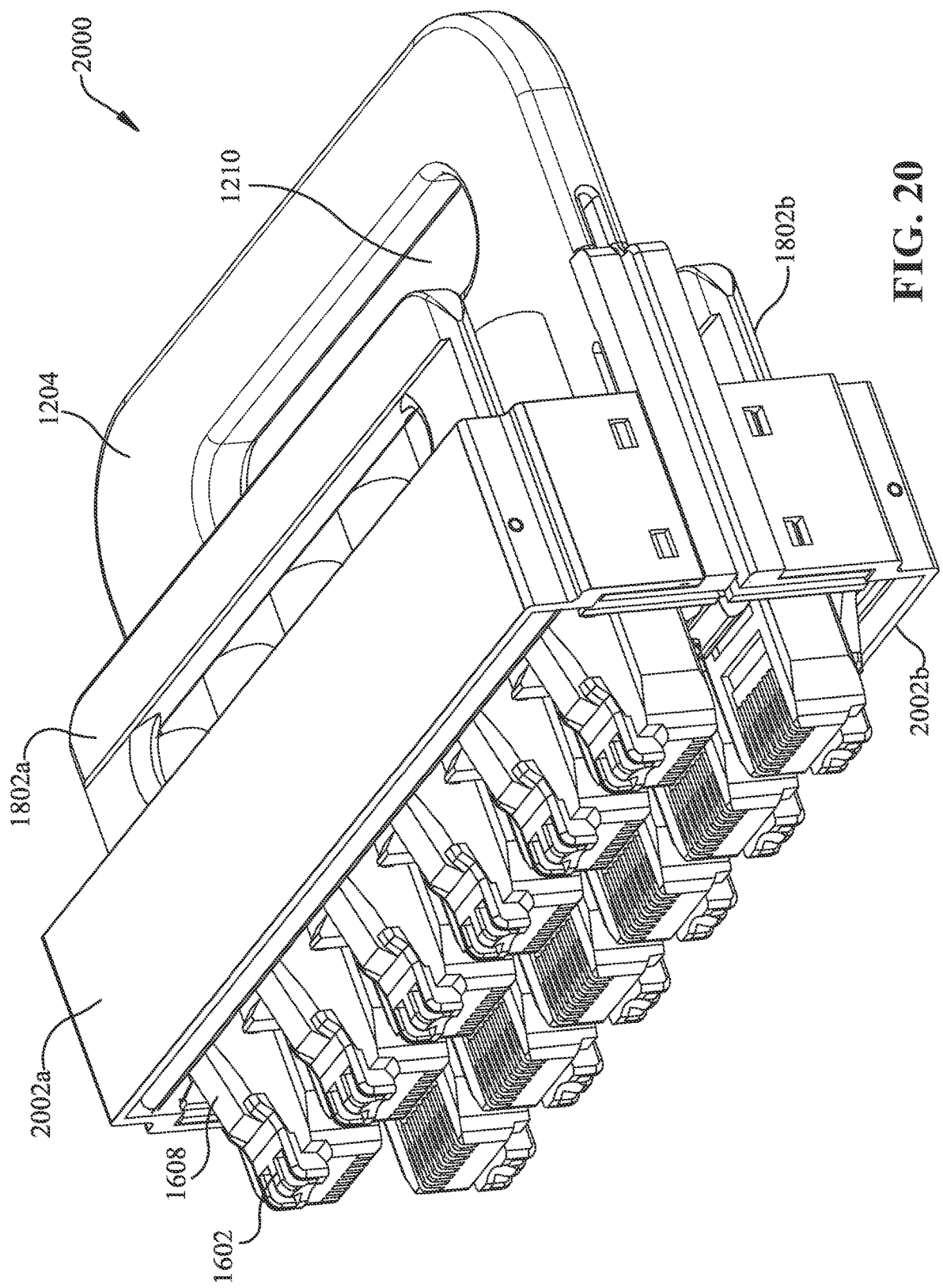
FIG. 20 is a perspective view of an assembled segmental switch module in which two cover plates have been installed over the cross plates and mounting arms of the attachment plates.
Figure 21:
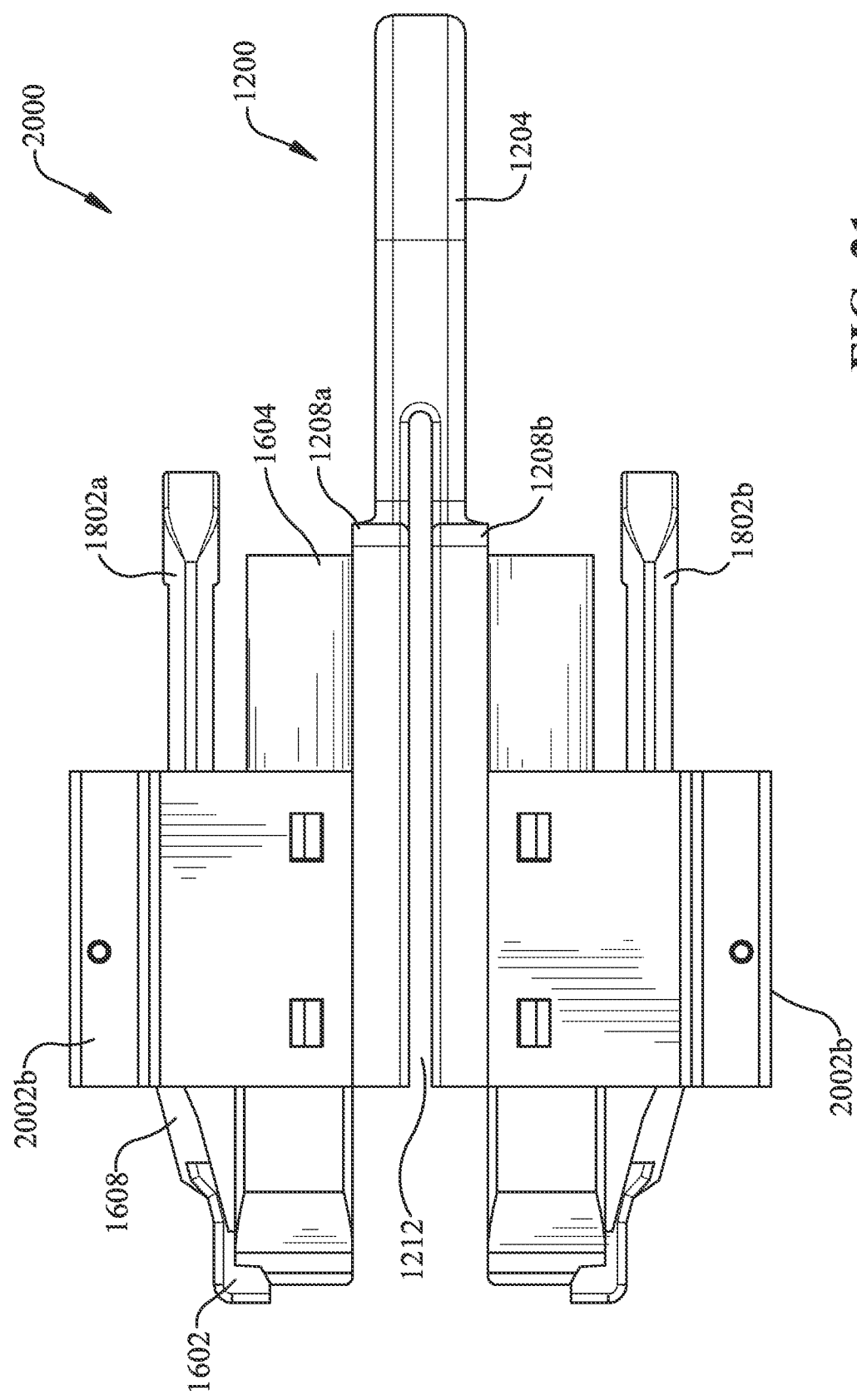
FIG. 21 is a side view of the assembled segmental switch module.

FIG. 19 is a perspective view of the assembly depicted in FIG. 18 in which two cross plates 1902a and 1902b have been installed on the attachment arms 1804 of the attachment plates 1802a and 1802b. FIG. 20 is a perspective view of the fully assembled segmental switch module 2000 in which two cover plates 2002a and 2002b have been installed over the cross plates 1902a, 1902b and attachment arms 1804 of the attachment plates 1802a, 1802b. FIG. 21 is a side view of the segmental switch module 2000. The resulting segmental switch module 2000 can be used to hold 12 connectors 1602 in a group such that the connectors 1602 can be plugged into a 2×6 data port array substantially simultaneously. Once the module 2000 is plugged into an array of data points, the cover plates 2002, 2002b can prevent access to the latches of the individual connectors, thereby preventing accidental disconnection. In some embodiments, the latches 1608 of the connectors 1602 can be accessed by removing the cover plates 2002a, 2002b and pressing on the cross plates 1902a, 1902b to bend the latches 1608 to their disconnect positions, allowing the module 2000 to be unplugged by pulling on the handle section 1204 of the middle plate 1200. Alternatively, in some embodiments the cover plates 2002a, 2002b can include respective openings that permit a key to be inserted through each cross plate 1902a, 1902b. When inserted, the keys displace the cross plates 1902a, 1902b and move the latches 1608 to their unlatch positions, allowing the module 2000 to be unplugged from the data port array.

The gap 1212 between the two mounting plates 1208a and 1208b permits the planks 1206 of the two mounting plates 1208a, 1208b to flex vertically. Also, as noted above, each dividing wall 1202 is permitted to flex horizontally within its corresponding slot 1214 of the two mounting plates 1208. These degrees of freedom permit the same switch module 2000 to accommodate different data port arrays having different port-to-port spacings by allowing the horizontal and vertical spacings between the connectors 1602 to float as needed.

Although FIGS. 12-21 depict a switch module 2000 designed to hold 12 connectors 1602 in a 2×6 arrangement, the design can be modified to accommodate different numbers of connectors 1602.

As another approach to accommodating devices having different numbers of ports and different port-to-port spacings, a modular connector system can be provided to allow data connector assemblies to be built in a customized manner to interface with a given device (e.g., a switch or a patch panel device). Such a modular system can offer a number of individual components that can be assembled into customized structure for clustering cables and their associated data connectors to yield a connector assembly that is compatible with the mating device.

Multi-user telecommunications outlet assemblies (MUTOAs) are connectivity devices comprising multiple data outlets designed to provide voice and data connectivity for multiple workstations. While the ANSI/TIA-568 Standard dictates that no more than 12 user workstations should be serviced from a single MUTOA, the number of available data ports can vary across different MUTOAs, and can conform to a variety orientations (e.g., 2×2, 12×4, 12×6, 3×4, etc.). Given this range of sizing possibilities, there is no single connector housing device that is compatible for all MUTOA applications.

Figure 22:
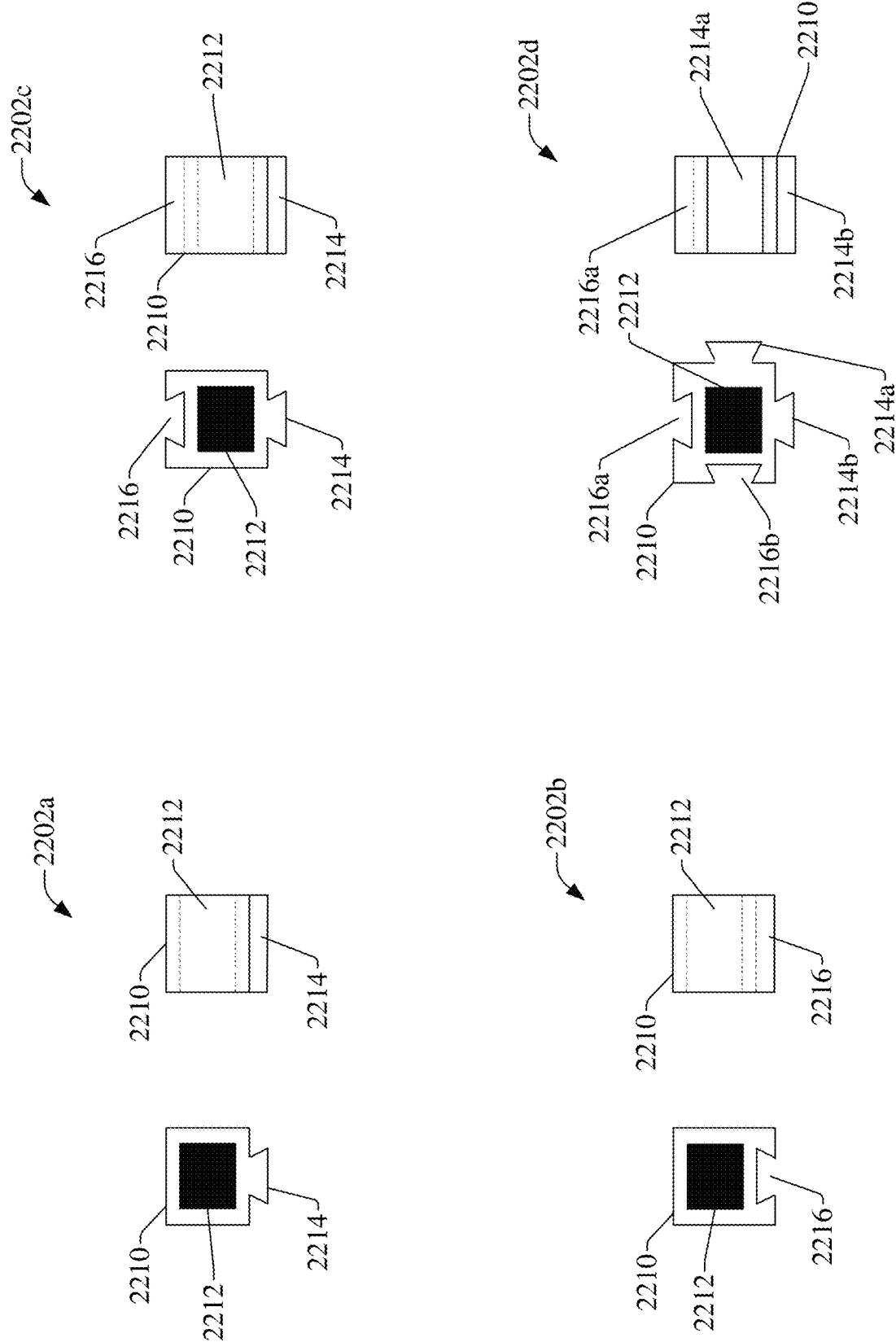
FIG. 22 are front and side views of four example types of modular connector housings that can be connected together in a modular fashion to yield a customized connector management assembly.

To address these and other issues, a modular MUTOA system can be provided that allows a suitable connector management structure to be assembled from modular components to suit the requirements of a given MUTOA application. FIG. 22 are front and side views of four example types of modular connector housings 2202*a*-2202*d* that can be connected together in a modular fashion to yield a customized connector management assembly. Each of the example modular housings 2202 depicted in FIG. 22 comprise a main body 2210 that defines an opening 2212 sized to permit a connector to be inserted. Different embodiments of the modular housings 2202 can be configured to accommodate different types of connectors, including but not limited to category-rated jacks such as RJ-45 connectors, simplex or duplex LC fiber connectors, or another type of connector.

Each modular housing 2202 also includes at least one of a dovetail socket 2216 or a dovetail pin 2214. For example, modular housing 2202*a* has a single dovetail pin 2214 formed along one side of its main body 2210, while modular housing 2202*b* has a dovetail socket 2216 formed along one side of its main body 2210. Modular housing 2202*c* has a dovetail socket 2216 formed along a first side of its main body 2210 and a dovetail pin 2214 formed along a second side of its main body 2212 opposite the first side. Modular housing 2202*d* has two dovetail sockets 2216*a*, 2216*b* formed along two adjacent sides of its main body 2210, and two dovetail pins 2214*a*, 2214*b* formed along the remaining two adjacent sides of the main body 2210.

Although the connection features formed on the modular housings 2202 are illustrated and described herein as being dovetail sockets 2216 and dovetail pins 2214, any suitable type of connection feature is within the scope of one or more embodiments. For example, another type of male connection feature can be used in place of the dovetail pins 2214, while another type of female connection feature can be used in place of dovetail sockets 2214.

Figure 23:
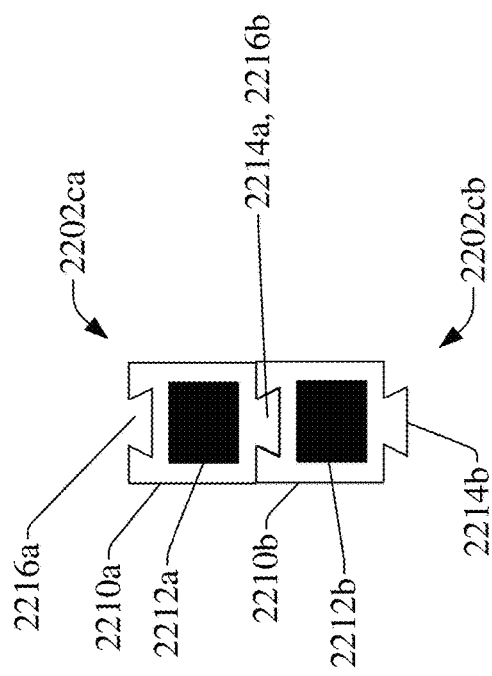
FIG. 23 is a front view of two modular housings that have been joined together.
Figure 24:
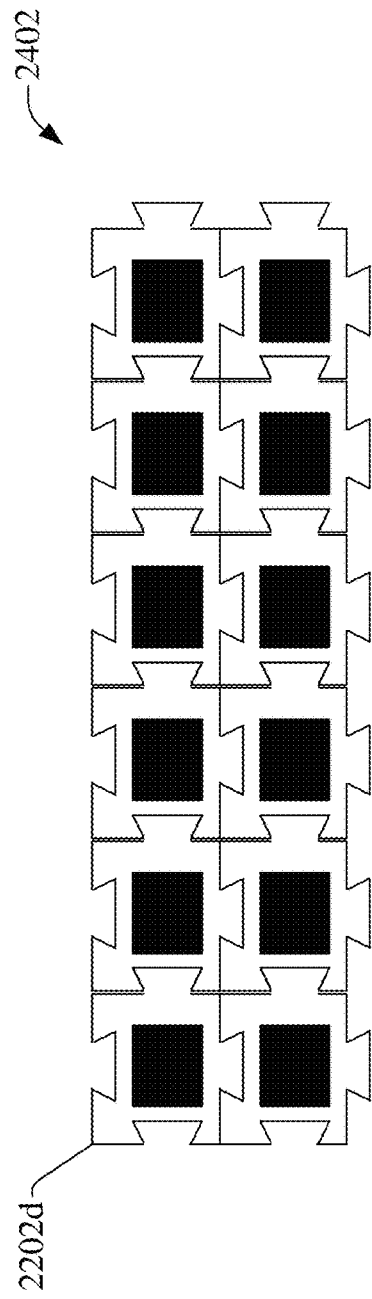
FIG. 24 is an example 6×2 connector management assembly assembled using modular housings.

FIG. 23 is a front view of two modular housings 2202*ca* and 2202*cb* that have been joined together. Any dovetail pin 2214 of a first modular housing 2202 can be mated with any dovetail socket 2216 of a second modular housing 2202 by orienting the two modular housings 2202 such that the pin 2214 and socket 2216 are aligned and sliding the pin 2214 into the socket 2216. In the example depicted in FIG. 23, pin 2214*a* of modular housing 2202*ca* has been engaged with socket 2216*b* of modular housing 2202*cb*. Modular housings 2202 can be joined together in this manner across two dimensions (horizontally and vertically), allowing an array of substantially any size to be built. FIG. 24 is an example 6×2 connector management assembly 2402 assembled using modular housings 2202*d*. This modular approach allows a user to customize a suitable connector management assembly to match the configuration of a given MUTOA data port array.

In some embodiments, the modular housings 2202 can include markable surfaces on at least one side of the main body 2210 so that each modular housing 2202 can be labeled with such information as a port identifier, device number, identification of a longest permitted patch cord, or other such information.

Figure 25:
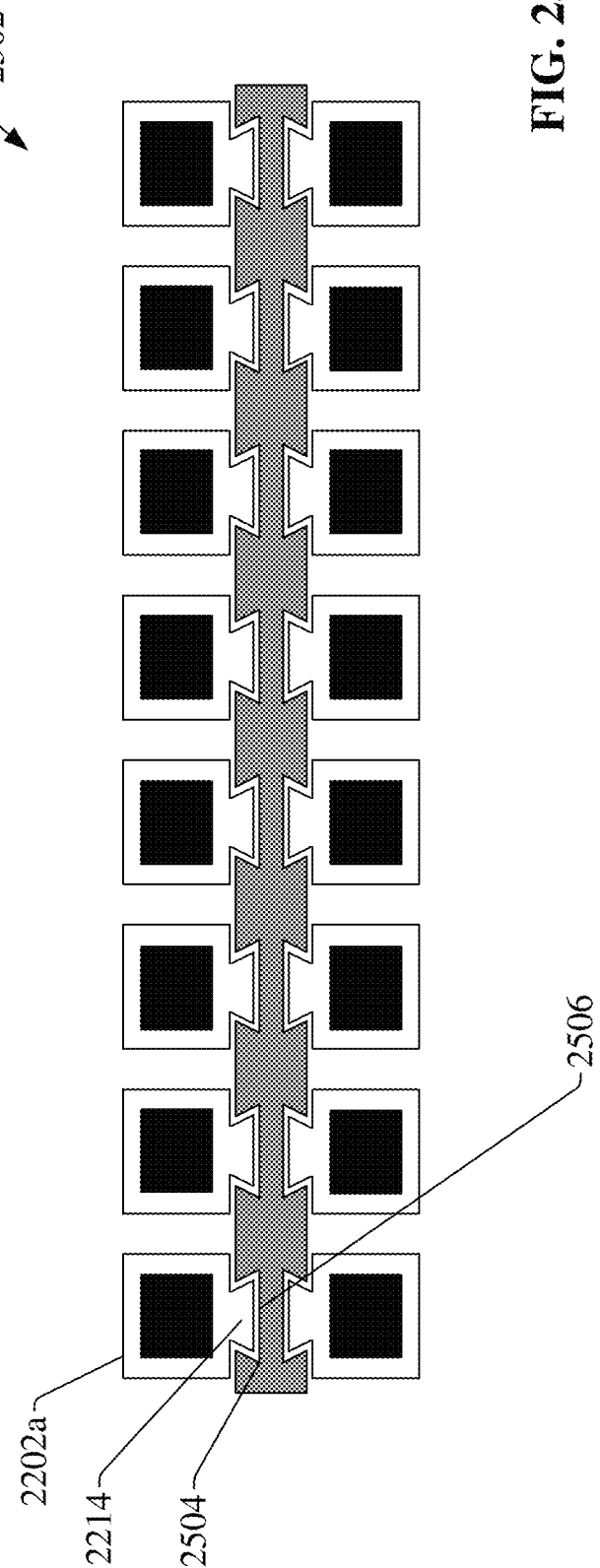
FIG. 25 is a front view of an example 8×2 connector management assembly comprising a mounting bracket on which are mounted 16 modular housings.

The modular housings 2202 can also be used with accessories to create custom configurations. FIG. 25 is a front view of an example 8×2 connector management assembly 2502 comprising a mounting bracket 2504 on which are mounted 16 modular housings 2202*a*. Example mounting bracket 2504 comprises 16 dovetail sockets 2506 oriented such that eight of the sockets 2506 are formed on each of the top and bottom sides of the bracket 2504. The dovetail pins 2214 of each modular housing 2202*a* can be engaged with the respective sockets 2506 to attach the housings 2202*a* to the bracket 2504, yielding the 8×2 arrangement. Although FIG. 25 depicts the bracket 2504 as comprising multiple instances of the female connection feature (the dovetail socket 2506), in some embodiments the bracket 2504 can have multiple instances of the male connection feature (e.g., the dovetail pin), which are configured to engage with the female engagement feature of the modular housings 2202.

Figure 26:
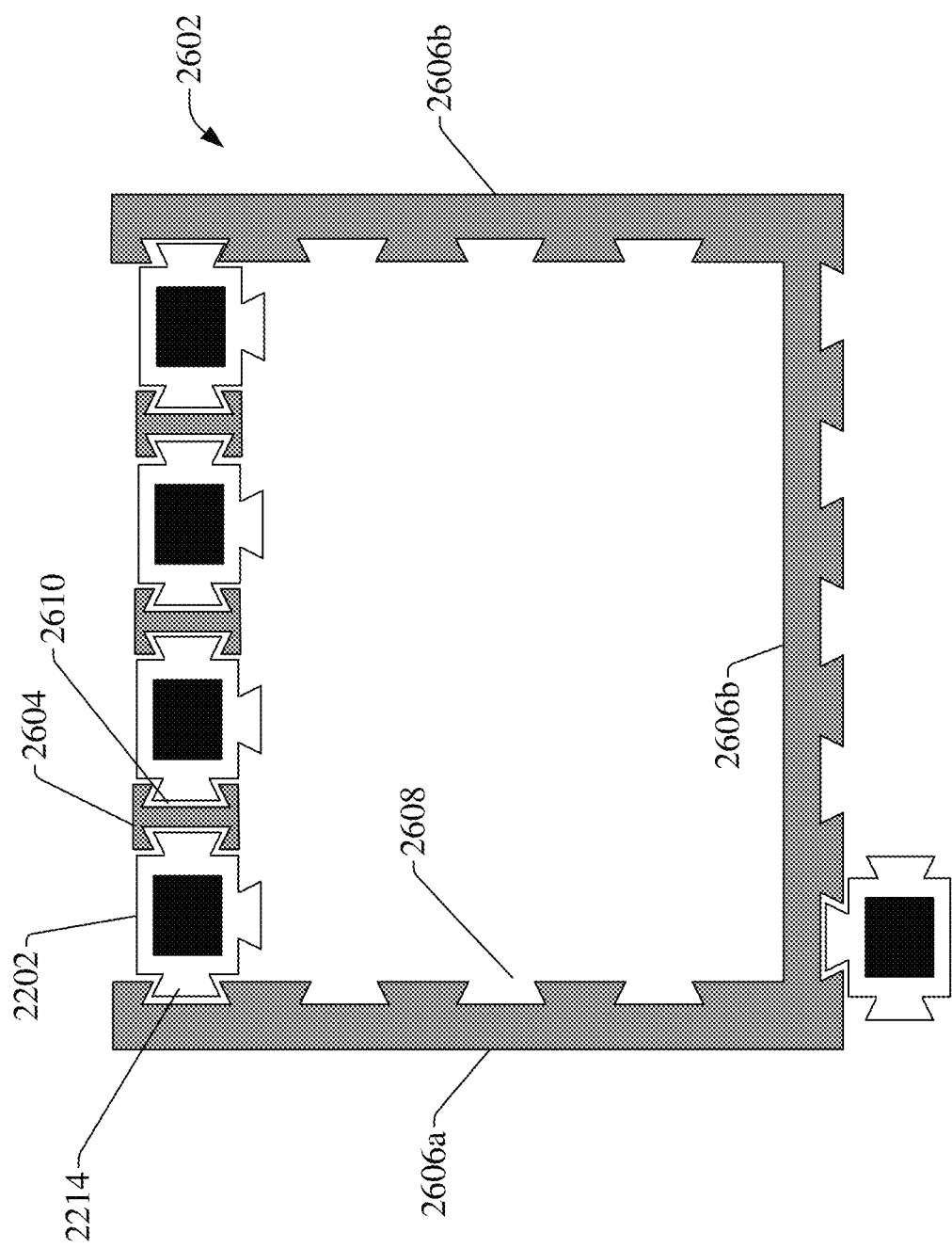
FIG. 26 is a front view of an example bracket having two vertical sides connected to a horizontal side at right angles.

Brackets of other shapes and configurations are also within the scope of one or more embodiments. For example, FIG. 26 is a front view of an example bracket 2602 having two vertical sides 2606*a* and 2606*b* connected to a horizontal side 2606*b* at right angles. Each of the three sides has a number of dovetail sockets 2608 formed thereon. The dovetail pins 2214 of modular housings 2202 can be engaged with these sockets 2608 to attach the housings 2202 to the bracket 2602. In order to build arrays across the bracket, modular housings 2202 can be connected vertically across the bracket 2602, either by direct connection between the modular housings 2202 (as illustrated in FIG. 24) or using connection bars 2604 having dovetail sockets 2610 formed on respective two sides, which can be used to connect to housings 2202 having dovetail pins 2214 that face one another.

Figure 27:
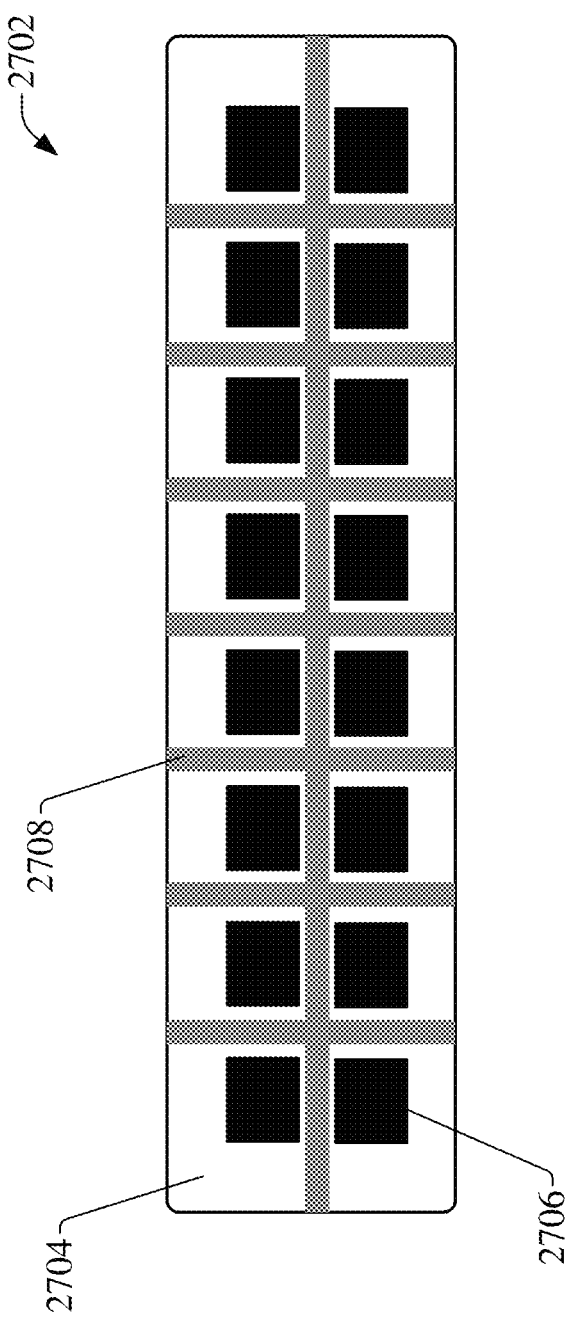
FIG. 27 is a front view of an example connector organizer that allows spacings between connectors to float, thereby allowing the organizer to be used with data port arrays having different port-to-port spacings.

FIG. 27 is a front view of an example connector organizer 2702 that allows spacings between connectors to float, thereby allowing the organizer 2702 to be used with data port arrays having different port-to-port spacings. Connector organizer 2702 comprises a main body 2704 through which are formed a number of openings 2706 that are sized to receive respective connectors (e.g., category-rated connectors, fiber optic connectors, etc.). The example organizer 2702 depicted in FIG. 27 supports an 8×2 array of connectors. However, organizers 2702 having other array dimensions are also within the scope of one or more embodiments.

A floating mechanism 2708 is also built into the main body 2704 between the openings 2706. This floating mechanism 2708 permits the spacing between the openings 2706 to float within a range of movement, thereby allowing the organizer 2702 to adjust the connector spacings as necessary to properly interface with data port arrays of different spacings. Any suitable floating mechanism 2708 is within the scope of one or more embodiments. For example, in some embodiments, the floating mechanism 2708 can comprise an elastic material formed between the openings 2706. In other embodiments, the floating mechanism 2708 may be part a mechanical adjustment system whereby the spacing can be adjusted via mechanical control (e.g., by turning an adjustment screw.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A connector assembly, comprising:
   a housing assembly configured to hold a first pair of data connectors and a second pair of data connectors arranged in a linear formation,
   wherein
   the housing assembly comprises a bottom clip comprising:
      a base plate,
      a first end wall that extends perpendicular from a first end of the base plate,
      a second end wall that extends perpendicular from a second end of the base plate,
      a dividing wall that extends perpendicular from the base plate at a location between the first end wall and the second end wall,
      a first rail formed on the base plate that extends from the first end wall toward the dividing wall, and
      a second rail formed on the base plate that extends from the second end wall toward the dividing wall, and
   the housing assembly permits the first pair of data connectors and the second pair of data connectors to be moved within the housing assembly independently of one another in a direction orthogonal to a length-wise direction of the first pair of data connectors and the second pair of data connectors.

2. The connector assembly of claim 1,
   wherein a first chamber between the first end wall and the dividing wall is configured to hold the first pair of data connectors, and a second chamber between the second end wall and the dividing wall is configured to hold the second pair of data connectors.

3. The connector assembly of claim 1, further comprising a first spacer configured to slide along the first rail and to maintain separation between a first connector and a second connector of the first pair of data connectors, and
   a second spacer configured to slide along the second rail and to maintain separation between a third connector and a fourth connector of the second pair of data connectors.

4. The connector assembly of claim 3, wherein the first spacer and the second spacer comprise respective grooves configured to receive the first rail and the second rail, respectively.

5. The connector assembly of claim 1, further comprising a first spring attached to the first end wall and configured to apply a first spring force that pushes the first pair of data connectors toward the dividing wall, and
   a second spring attached to the second end wall and configured to apply a second spring force that pushes the second pair of data connectors toward the dividing wall.

6. The connector assembly of claim 1, wherein the housing assembly further comprises a top clip configured to attach to the bottom clip.

7. The connector assembly of claim 6, wherein the top clip comprises a top bar attached to an outer top surface of the top clip by two flexible arms, the top bar configured to make contact with latches of the first pair of data connectors and the second pair of data connectors while the top clip is attached to the bottom clip.

8. The connector assembly of claim 7, wherein application of a force to the top bar displaces the latches to an unlatched position.

9. The connector assembly of claim 1, wherein the first pair of data connectors and the second pair of data connectors comprise fiber optic connectors or copper cable connectors.

10. The connector assembly of claim 1, wherein the first pair of data connectors and the second pair of data connectors comprise chamfered ends.

11. The connector assembly of claim 1, wherein at least one of the first pair of data connectors or the second pair of data connectors comprises a duplex connector.

12. A connector assembly, comprising:
a bottom clip; and
a top clip configured to attached to the bottom clip to form a housing,
wherein
the bottom clip comprises a first end wall extending perpendicular from a first end of a base plate, a second end wall extending perpendicular from a second end of the base plate, and a dividing wall at a location between the first end wall and the second end wall,
the base plate comprises a first rail that extends from the first end wall toward the dividing wall, and a second rail that extends from the second end wall toward the dividing wall, and
the housing is configured to hold a first pair of simplex connectors and a second pair of simplex connectors in a liner formation, to allow the first pair of simplex connectors to slide as a group between the first end wall and the dividing wall, and to allow the second pair of simplex connectors to slide as a group between the second end wall and the dividing wall.

13. The connector assembly of claim 12, wherein
the first wall, the base plate, and the dividing wall form a first chamber that holds the first pair of simplex connectors, and
the second wall, the base plate, and the dividing wall form a second chamber that holds the second pair of simplex connectors.

14. The connector assembly of claim 12, further comprising:
a first spacer configured to slide along the first rail and to maintain separation between the first pair of simplex connectors, and
a second spacer configured to slide along the second rail and to maintain separation between the second pair of simplex connectors.

15. The connector assembly of claim 12, further comprising:
a first spring configured to apply a first spring force that pushes the first pair of simplex connectors toward the dividing wall, and
a second spring configured to apply a second spring force that pushes the second pair of simplex connectors toward the dividing wall.

16. The connector assembly of claim 12, wherein
the top clip comprises a top bar attached to an outer top surface of the top clip by two flexible arms, and
the top bar is configured to make contact with latches on the first pair of simplex connectors and the second pair of simplex connectors while the top clip is attached to the bottom clip.

17. The connector assembly of claim 16, wherein application of a force to the top bar displaces the latches to an unlatched position.

18. A connector assembly, comprising:
a housing assembly configured to hold at least four data connectors in a linear formation, and to allow a first pair of the at least four data connectors and a second pair of the at least four data connectors to slide within the housing assembly independently of one another in a direction orthogonal to a length-wise direction of the at least four data connectors,
wherein the housing assembly comprises a bottom clip, and the bottom clip comprises:
a base plate,
a first end wall that extends perpendicular from a first end of the base plate,
a second end wall that extends perpendicular from a second end of the base plate,
a dividing wall that extends perpendicular from the base plate at a location between the first end wall and the second end wall,
a first rail formed on the base plate that extends from the first end wall toward the dividing wall, and
a second rail formed on the base plate that extends from the second end wall toward the dividing wall.

19. The connector assembly of claim 18, further comprising:
a first spacer configured to slide along the first rail and to maintain separation between the first pair of the at least four data connectors, and
a second spacer configured to slide along the second rail and to maintain separation between the second pair of the at least four data connectors.

20. The connector of claim 19, wherein the first spacer and the second spacer comprise respective grooves configured to receive the first rail and the second rail, respectively.

* * * * *